(12) United States Patent
McGuire et al.

(10) Patent No.: US 12,205,601 B1
(45) Date of Patent: Jan. 21, 2025

(54) CONTENT RECOGNITION USING FINGERPRINTING

(71) Applicant: Amazon Technologies, Inc., Seattle, WA (US)

(72) Inventors: David McGuire, Medford, MA (US); Ahmed Abdelal, North Andover, MA (US); Sai Kiran Venkata Subramanya Rupanagudi, Burien, WA (US); Sumit Garg, Acton, MA (US); Terrence Yu, Quincy, MA (US); Nathaniel White, Aldie, VA (US); Siddharth Agrawal, Hanover, NH (US); Pavas Kant, Winchester, MA (US); Yuxuan Hao, Natick, MA (US); Nagaraj Mahajan, Allston, MA (US); Ameya Agaskar, Bedford, MA (US); Aaron Challenner, Melrose, MA (US)

(73) Assignee: Amazon Technologies, Inc., Seattle, WA (US)

( * ) Notice: Subject to any disclaimer, the term of this patent is extended or adjusted under 35 U.S.C. 154(b) by 301 days.

(21) Appl. No.: 17/853,183

(22) Filed: Jun. 29, 2022

(51) Int. Cl.
| | |
|---|---|
| *G10L 19/018* | (2013.01) |
| *G06F 21/62* | (2013.01) |
| *G06V 20/40* | (2022.01) |
| *G11B 27/34* | (2006.01) |
| *H04R 3/00* | (2006.01) |

(52) U.S. Cl.
CPC ........ *G10L 19/018* (2013.01); *G06F 21/6218* (2013.01); *G06V 20/46* (2022.01); *G11B 27/34* (2013.01); *H04R 3/00* (2013.01); *G06V 2201/10* (2022.01); *H04R 2420/09* (2013.01)

(58) Field of Classification Search
None
See application file for complete search history.

(56) References Cited

U.S. PATENT DOCUMENTS

| | | | |
|---|---|---|---|
| 10,534,777 B2 | 1/2020 | Hedgecock | |
| 10,643,074 B1* | 5/2020 | McAninly | .............. G06N 20/10 |
| 11,627,059 B2 | 4/2023 | Bosworth et al. | |
| 2020/0366958 A1 | 11/2020 | Topchy et al. | |
| 2021/0281896 A1 | 9/2021 | Davis et al. | |

OTHER PUBLICATIONS

Office Action issued Jun. 6, 2024, for U.S. Appl. No. 17/853,279.
U.S. Office Action mailed Sep. 23, 2024 for U.S. Appl. No. 17/853,314.

* cited by examiner

*Primary Examiner* — Kenny H Truong
(74) *Attorney, Agent, or Firm* — Pierce Atwood LLP

(57) ABSTRACT

A system configured to perform content recognition using fingerprinting to recognize known media content. A device determines fingerprints based on decoded content data to be sent using a media interface component to an output component. Metadata related to the content/device/fingerprint may also be created. The fingerprints and metadata are sent by the device to a supporting system for orchestration and matching of the fingerprints to known media content.

20 Claims, 15 Drawing Sheets

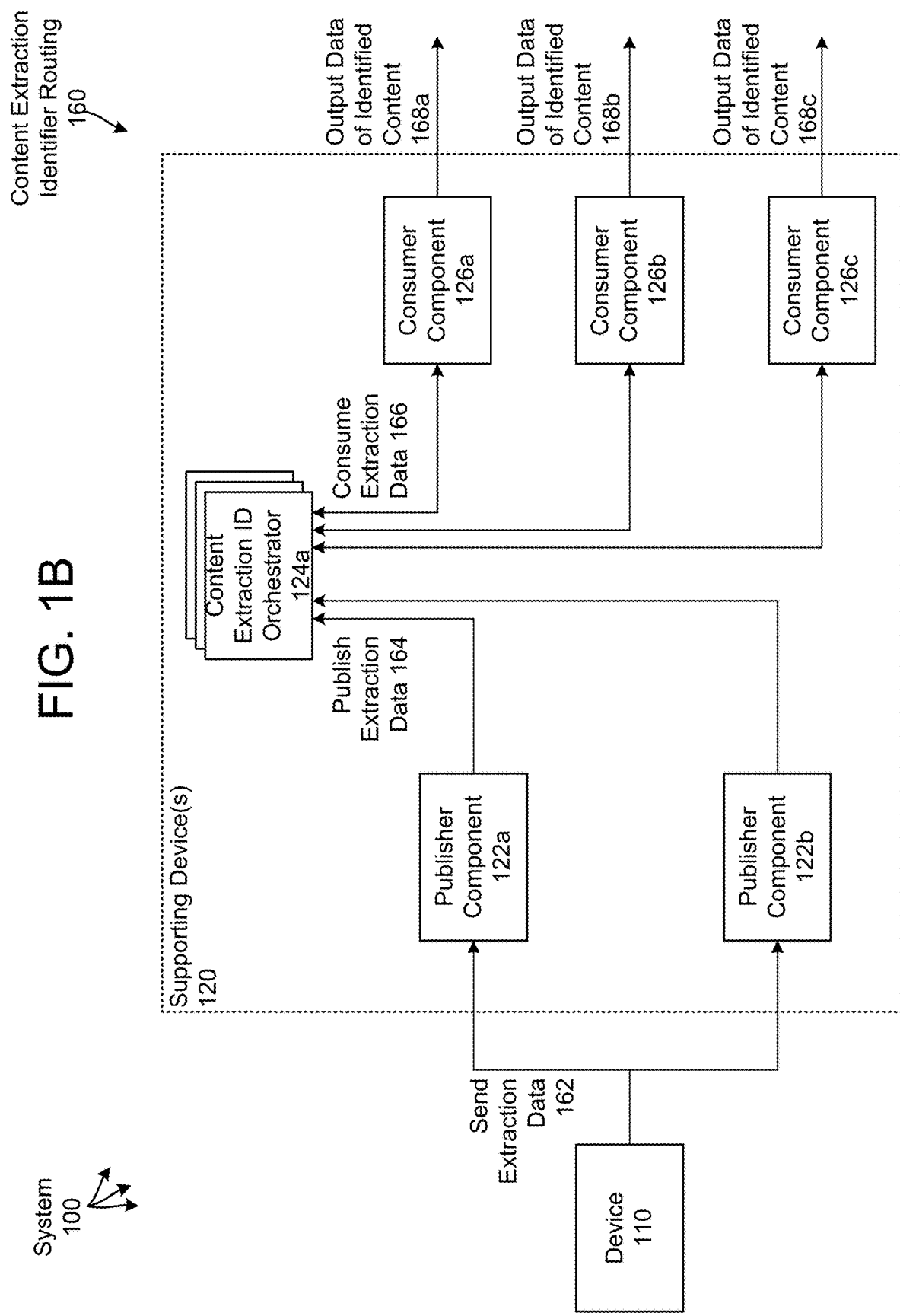

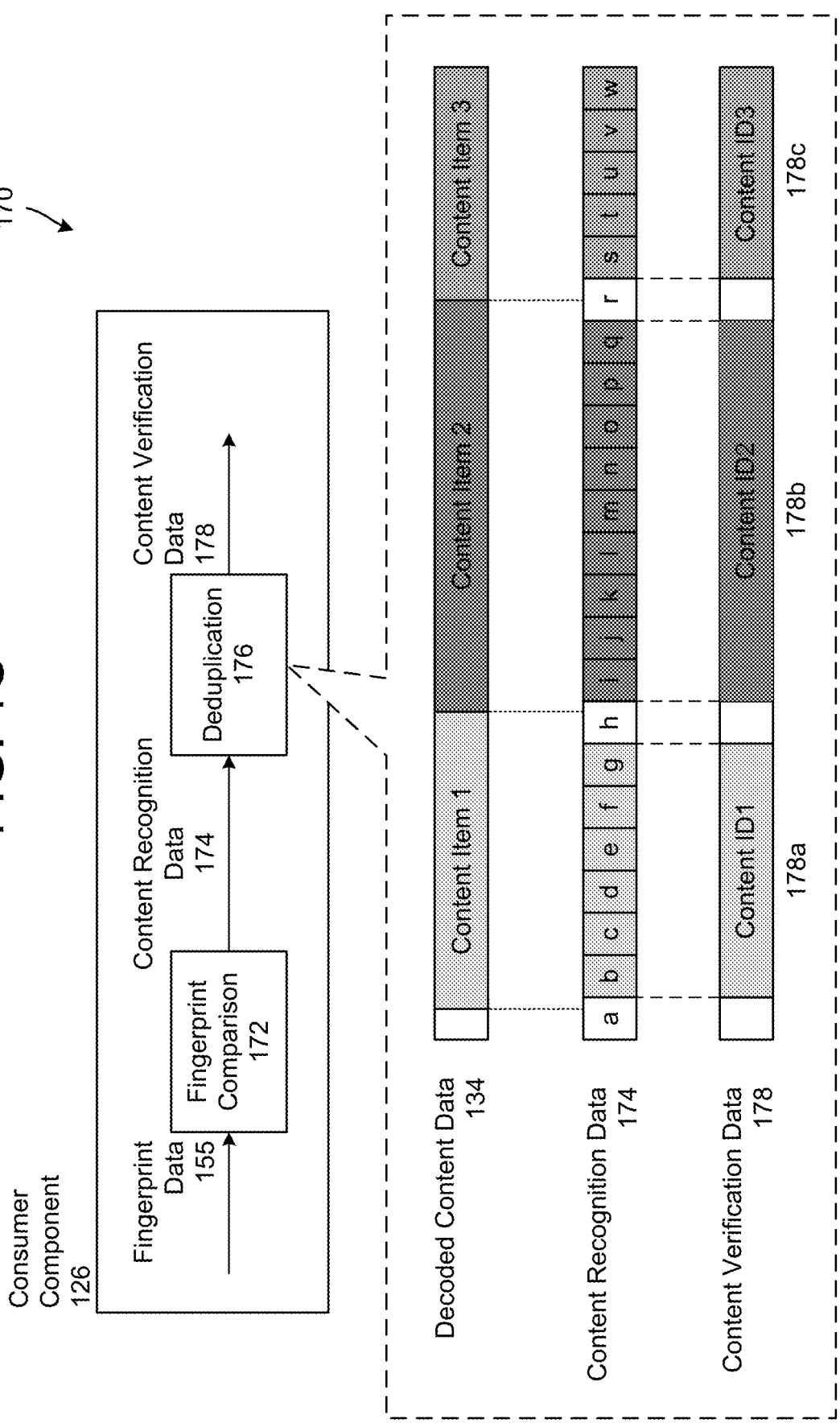

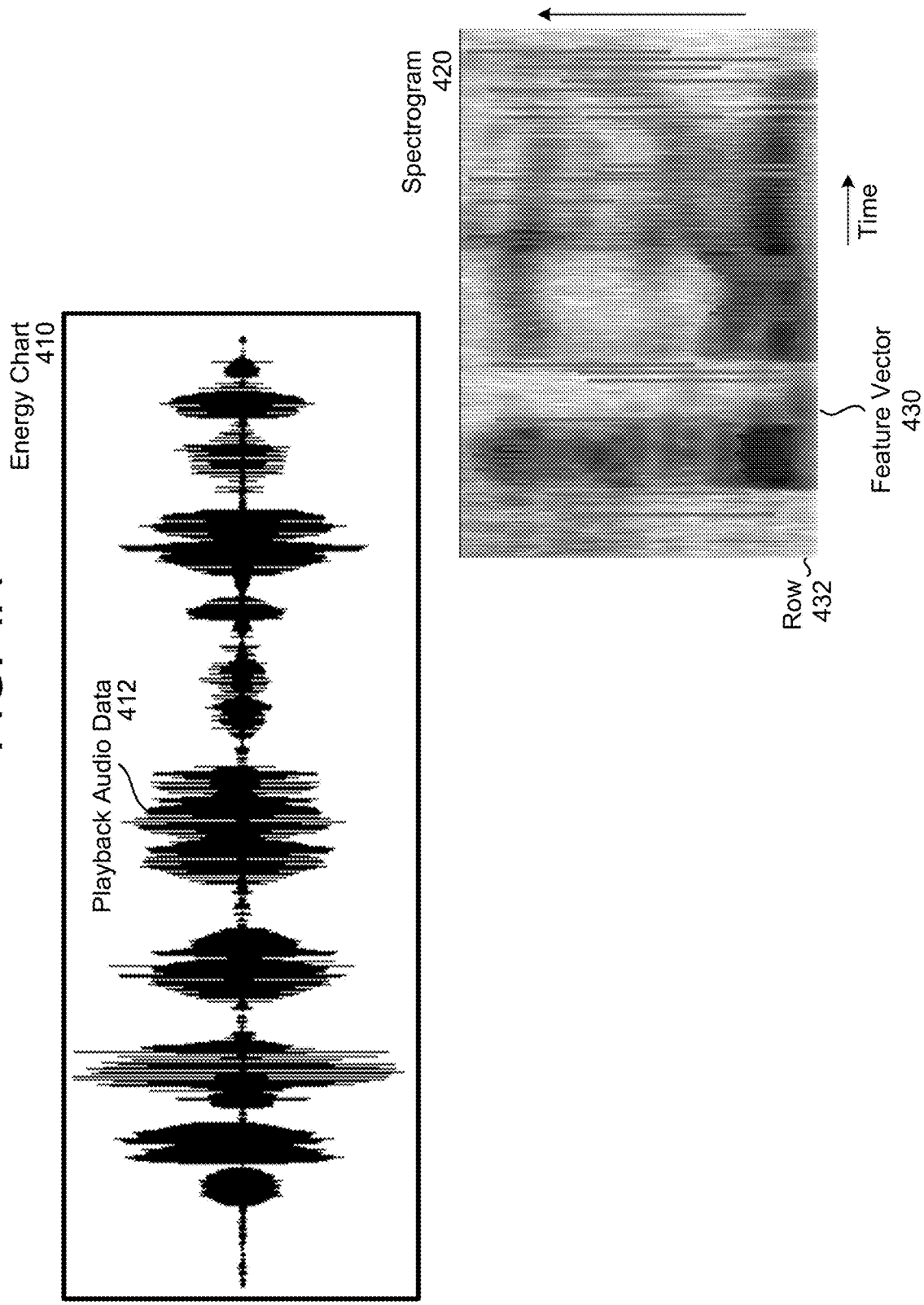

FIG. 4B
Spectrogram 440
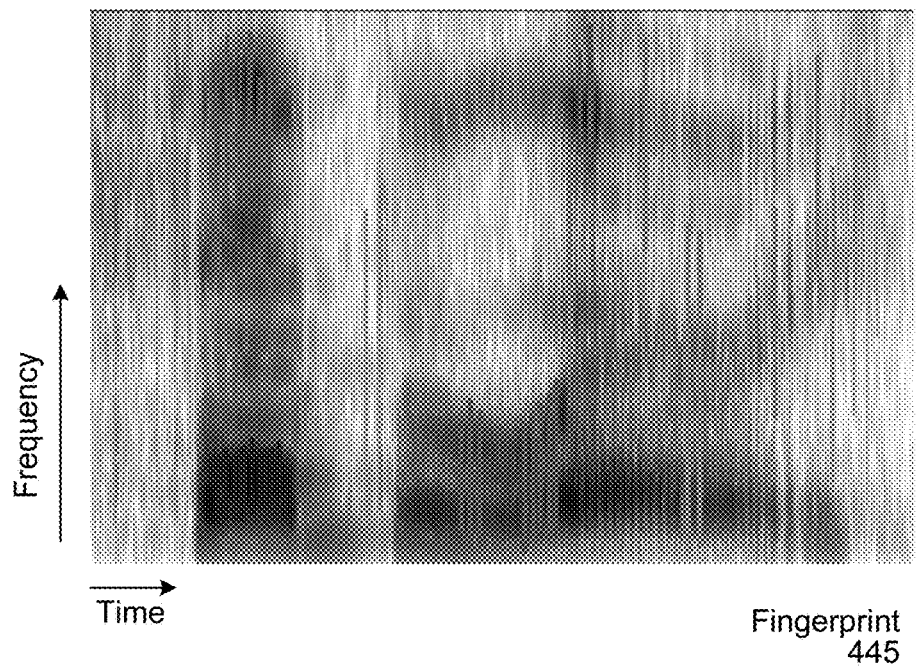
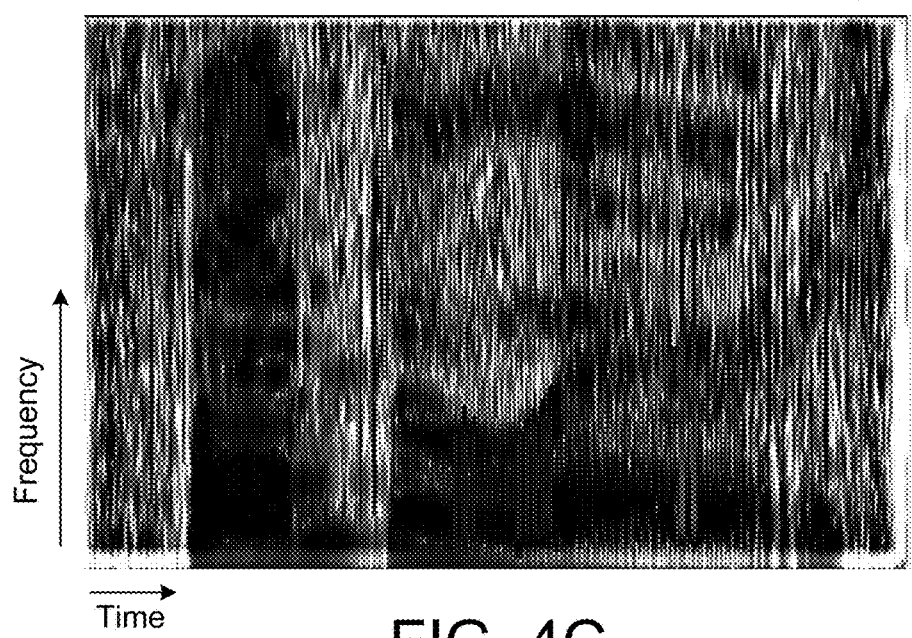
Fingerprint 445
FIG. 4C
Fingerprint 460
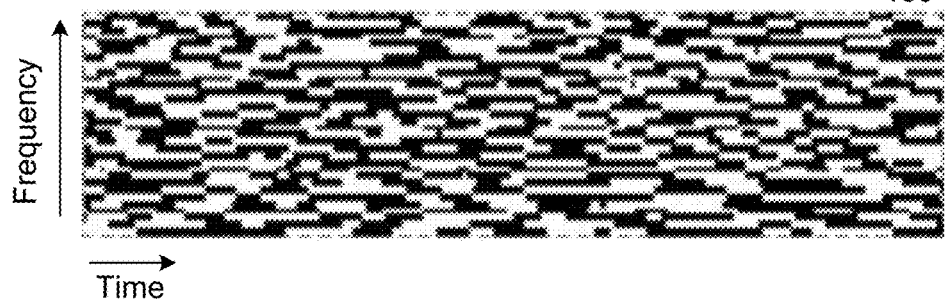

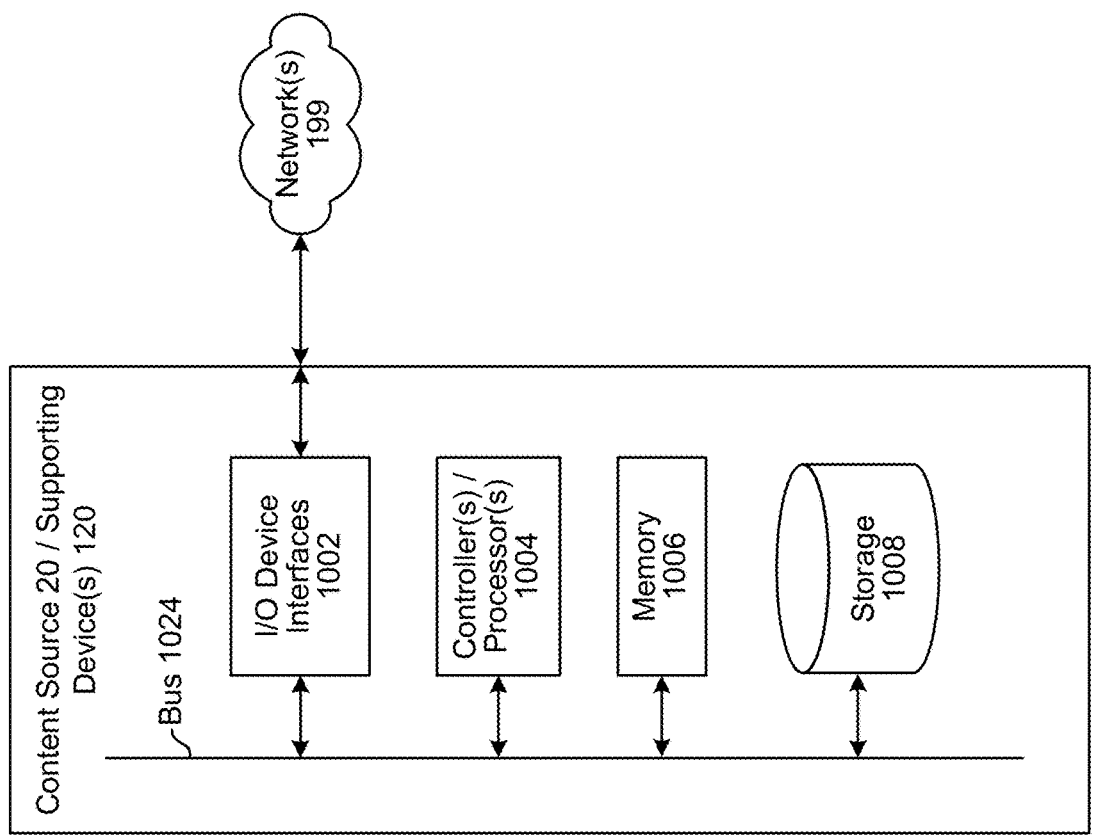

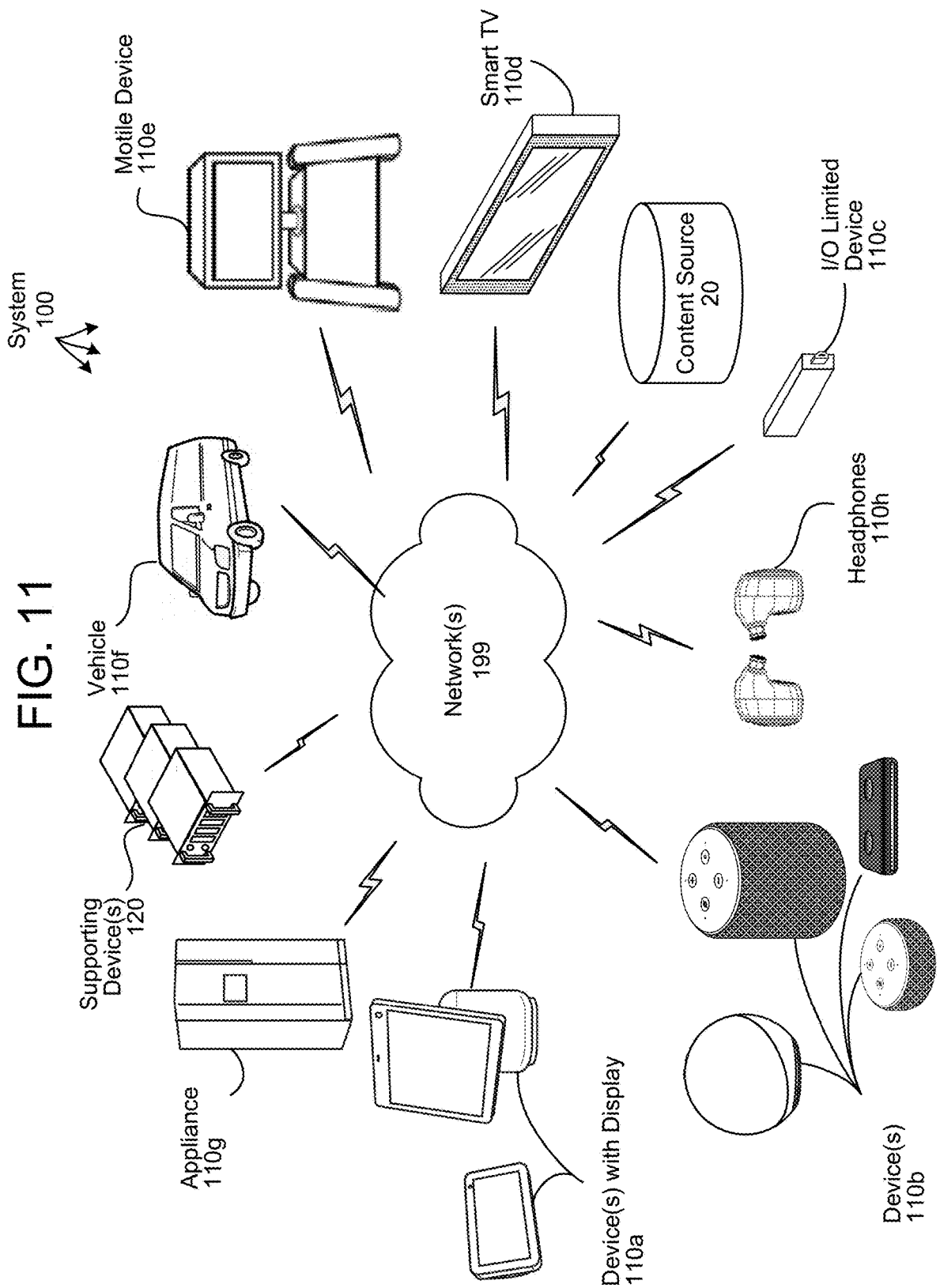

CONTENT RECOGNITION USING FINGERPRINTING

BACKGROUND

With the advancement of technology, the use and popularity of electronic devices has increased considerably. Electronic devices are commonly used to generate play media content.

BRIEF DESCRIPTION OF DRAWINGS

For a more complete understanding of the present disclosure, reference is now made to the following description taken in conjunction with the accompanying drawings.

FIG. 1B illustrates a system configured to route content extraction identifier data based on metadata according to embodiments of the present disclosure.

FIG. 1C illustrates a system configured to perform a deduplication process to generate content verification data according to embodiments of the present disclosure.

FIGS. 4A-4C illustrate examples of fingerprint generation according to embodiments of the present disclosure.

FIG. 10 is a block diagram conceptually illustrating example components of a system, according to embodiments of the present disclosure.

FIG. 11 illustrates an example of a computer network for use with the overall system, according to embodiments of the present disclosure.

DETAILED DESCRIPTION

Figure 1A:
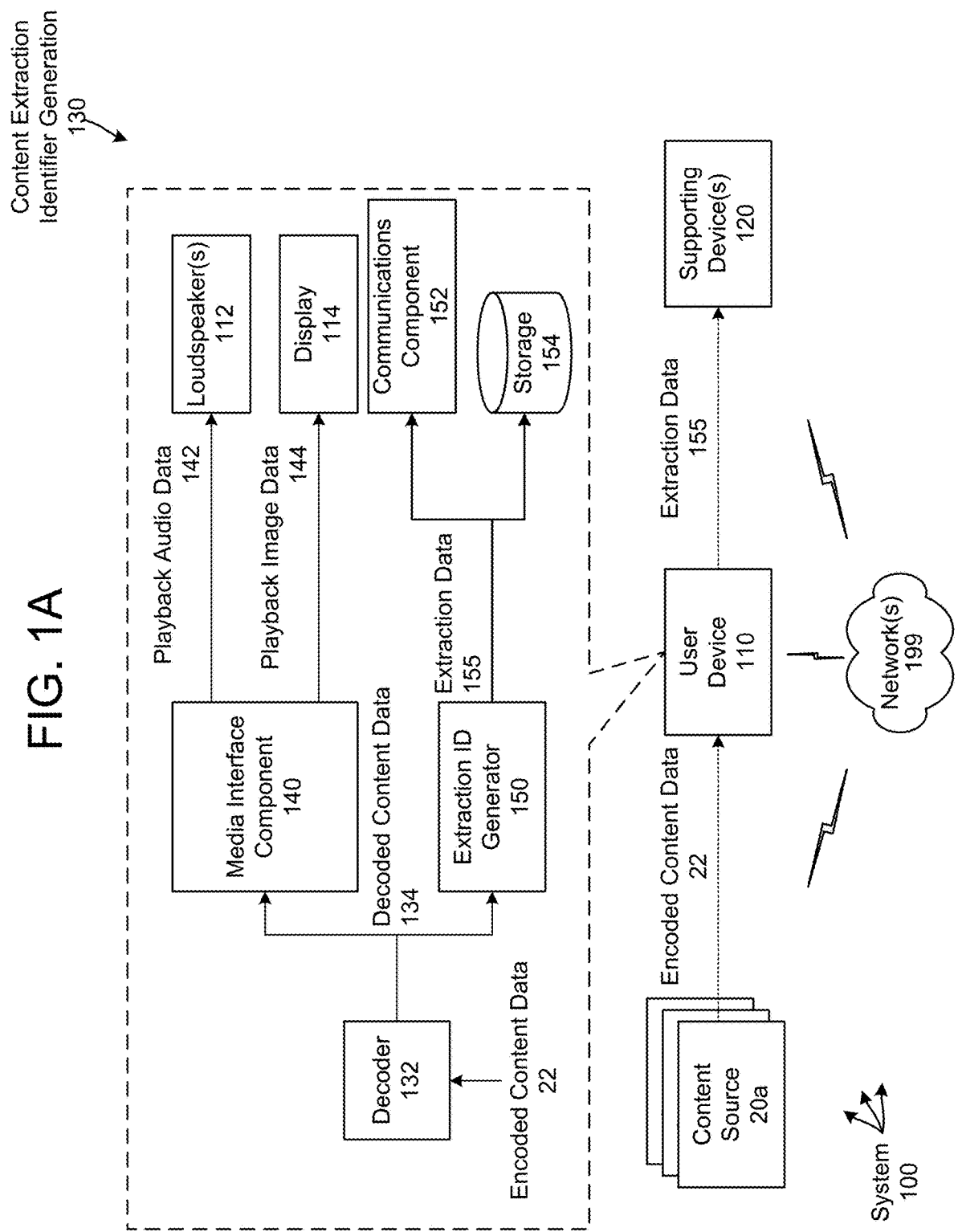
FIG. 1A illustrates a system configured to generate content extraction identifier data according to embodiments of the present disclosure.

Electronic devices may be used to output media content to a user. For example, a device may be configured to receive playback audio data and generate playback audio using one or more loudspeakers, haptic components, and/or other audio output components. Additionally or alternatively, the device may be configured to receive image data representing a video and output the video using a display, projector, laser, or other visual output component of the device. Thus, the device may play media content (e.g., music, television show, movie, etc.) for the user using the audio and/or the visual output.

In certain configurations it may be desirable to keep a log of or otherwise store data related to the content that a one or more devices played, where the data is generated at or near time of playback (e.g., between decoding and presentation of the content using an output component). Such a content log may be useful for a number of purposes, for example, ensuring that child and/or employee devices are only outputting approved content, determining which advertisements are output at what times and by what devices, determining types of content being consumed, determining popularity of individual pieces of content, providing enhanced context for an ambient system, such as Amazon's Alexa, among other things. Offered are techniques and systems for systematic techniques of determining content that is actually output by a device, which may more accurately/more precisely perform such operations than systems that may track based on what content is sent to a device. Discussed herein include techniques for determining fingerprints of content output by a device, routing such fingerprints to match them to specific content instances, organizational techniques for managing resulting information, and the like.

To improve a customer experience and provide additional functionality, devices, systems and methods are disclosed that perform content recognition using fingerprinting/content extracted identifiers to recognize known media content. For example, the system may generate a reference database of the known media content by generating reference fingerprints for each media content item to include in the content recognition. When a device is playing media content, the system may perform content recognition by generating a series of query fingerprints and comparing the query fingerprints to the reference database. For example, an individual query fingerprint may represent a short duration of the media content and the system may match the query fingerprint to a reference fingerprint by identifying which of the reference fingerprints shares the most frames with the query fingerprint.

Various techniques and operations may be used with such a system. For example, a device (e.g., capable of audio and/or video playback, etc.) may receive encoded audio/video data from a content source such as a music provider, television or video provider, podcast subscription, or the like. The device may decode (for example by decompressing, decrypting, or otherwise processing the encoded audio/video data for sending to a media interface component of the device for eventual output by an output component (e.g., display, loudspeaker, etc.) of the device. The device may also process the decoded audio/video data to generate content extracted identifiers such as a fingerprint, watermark, etc. The device may generate many such content extracted identifiers (for example, every few seconds) and send them to supporting component(s) to perform recognition of the content extracted identifiers and thus recognize the output content. To enable the system to perform content recognition with low latency, the device may send the content extracted identifiers at regular intervals, as they are created or in small batches (e.g., send batches of four fingerprints). If the device loses internet connectivity, the device may store all fingerprints and send them as a large batch when internet connectivity resumes.

As part of generating/sending the content extracted identifiers, the device may include metadata including various information, such as indicating relevant information that allows a content extracted identifier to be grouped or routed accordingly and/or enables other operations. Based on that metadata, the system (for example using an orchestrator)

may route the fingerprints to an appropriate consumer to perform an action corresponding to the content recognition. For example, the metadata may indicate a device type, type of content (e.g., audio or video), source of content (e.g., channel), content provider, location, batch process, anonymized ID, etc., enabling the system to group content extracted identifiers/fingerprints in different ways and select specific consumers to execute functionality based on the content extracted identifiers.

As multiple content extracted identifiers in a sequence may match the same media content, the system may perform a de-duplication process to group the content extracted identifiers together and output a single result. A time window of the de-duplication process may vary based on the content being detected, for example with a short time window used for 30-60 second content and a long time window used for longer content such as movies. Thus, the system includes multiple different databases configured to identify media content using different settings. For example, the databases may retrieve content extracted identifiers at different intervals, use different time windows for de-duplication, and/or perform different actions in response to identifying the media content.

FIG. 1A illustrates a high-level conceptual block diagram of a system 100 configured to generate fingerprint data according to embodiments of the present disclosure. Although FIGS. 1A-1C, and other figures/discussion illustrate the operation of the system in a particular order, the steps described may be performed in a different order (as well as certain steps removed or added) without departing from the intent of the disclosure. As illustrated in FIG. 1A, the system 100 may include a user device 110 that may be communicatively coupled to network(s) 199. Device 110 may include components shown in FIG. 1A, FIG. 9, and/or discussed elsewhere or otherwise common to devices 110. In addition, the system 100 may include one or more content sources 20, one or more supporting device(s) 120, and/or additional devices (not illustrated) that may be communicatively connected to the device 110 via the network(s) 199, although the disclosure is not limited thereto.

The device 110 may be an electronic device configured to receive playback audio data and generate playback audio (e.g., output audio) using one or more loudspeakers of the device 110. For example, the device 110 may generate playback audio corresponding to media content, such as music, a movie, and/or the like, although the disclosure is not limited thereto. As part of outputting media content for a user, the device 110 may generate the playback audio and/or playback video on a display of the device 110, although the disclosure is not limited thereto. In order to enable additional functionality, in some examples the system 100 may perform content recognition to determine the media content being output by the device 110. For example, identifying the media content may enable enhanced entity resolution, which allows the system 100 to interpret voice commands based on the specific media content being output to the user, although the disclosure is not limited thereto.

As illustrated in FIGS. 1A-1C, the system 100 may perform content recognition using fingerprinting to recognize known media content. A fingerprint may correspond to data representing certain features of content. Such fingerprints may be used to match unknown content (e.g., content output by a device) with known content (e.g., content tracked in a database or other data collection). Examples of fingerprint generation are discussed herein with respect to FIGS. 3-4C. For example, the system 100 may generate a reference database of known media content by generating reference fingerprints for each media content item to include in the reference database. When the device 110 is playing media content, the system 100 may perform content recognition by generating a continuing series of query fingerprints (e.g., playback fingerprints) and comparing the query fingerprints to reference fingerprints included in the reference database and/or additional reference databases. For example, an individual query fingerprint may represent a short duration of the media content and the system 100 may match the query fingerprint to a reference fingerprint by identifying which of the reference fingerprints shares the most frames with the query fingerprint and verifying that the number of frames exceeds a threshold, although the disclosure is not limited thereto.

While a single query fingerprint may match to multiple reference fingerprints, the system 100 may use a continuing series of query fingerprints to perform content verification and increase an accuracy of the content recognition output. For example, the system 100 may determine that multiple query fingerprints match to the same media content item, increasing a likelihood that the media content item identified by performing content recognition actually corresponds to the media content output by the device 110.

While the system 100 may perform content recognition to enable additional functionality, the system 100 may limit content recognition based on privacy controls associated with each user profile. For example, privacy preferences associated with an individual user profile may control types of media content on which the system 100 may perform content recognition, the type and/or amount of data that can be used to perform content recognition, which type of information should be anonymized and/or aggregated, and/or the like. Thus, the system 100 may provide additional functionality to user profiles that enable the additional functionality, while disabling the additional functionality to user profiles that have strict privacy settings or the like.

In addition, the system 100 is limited in the specific media content that the system 100 can recognize as content recognition can only be performed for known media content, which was previously processed and stored in a reference database. For example, in order to perform content recognition, the system 100 must first generate a reference database including any reference fingerprints with which the system 100 intends to match as part of identifying media content. Thus, the system 100 may be configured to perform content recognition using only specific media content that is owned by, licensed to, and/or made available to the system 100 by content providers. In some examples, the system 100 may include multiple reference databases, such that an individual reference database corresponds to a single content provider, in order to separate media content and/or reference fingerprints associated with different content providers.

As part of outputting the media content to the user, in some examples the device 110 may receive the media content as encoded content data 22 from a content source 20. For example, the content source 20 may generate the encoded content data 22 in order to protect the media content from piracy and/or copying while the media content is being transmitted to the device 110 via the network(s) 199. In some examples, the content source 20 may generate the encoded content data 22 using a Digital Rights Management (DRM) system that (i) uses encryption to protect the media content, (ii) uses specialized techniques to securely store and deliver encryption/decryption keys associated with the encryption, and/or (iii) allows content publishers to set business rules and control who can consume their media content (expiry times, etc.).

To illustrate an example, the content source 20 may encrypt the media content using a content encryption key (CEK) and/or the like, such that the device 110 must know the CEK in order to decode the encoded content data 22 and output the media content. For example, the CEK may be shared or somehow delivered to a user profile associated with the device 110, enabling the device 110 and only the device 110 to decode the encoded content data 22, although the disclosure is not limited thereto.

In one example, a content source 20a may correspond to a device of a video-on-demand service that sends encoded video content 22a to a device 110 for playback. In another example, a content source 20b may correspond to a device of a satellite-radio service that sends encoded audio content 22b to a device 110 for playback. In another example, a content source 20c may correspond to a device of a music streaming service that sends encoded audio content 22c to a device 110 for playback. In still another example, a content source 20d may correspond to a social media application that sends encoded video content 22d to a device for playback. As can be appreciated, many different examples of content source 20/encoded content data 22 may be possible depending on system configuration.

In the example illustrated in FIG. 1A, the device 110 receives the encoded content data 22 representing the media content from a first content source 20a of a plurality of content sources. For example, the first content source 20a may correspond to storage and/or routing components associated with a first content provider and the first content source 20a may be configured to provide media content and/or other data to the device 110 upon request.

In some examples, the first content source 20a may correspond to an entertainment platform (e.g., cable provider, streaming service, subscription service, and/or the like, although the disclosure is not limited thereto) that is associated with the user profile. For example, the user profile may include login information and/or other account credentials that enable the device 110 to authorize and/or validate an account associated with the first content source 20a. However, the disclosure is not limited thereto and the first content source 20a may provide the media content and/or other data free of charge and/or without verifying account information without departing from the disclosure.

To select the media content to output, the device 110 may offer a user interface that enables the user to browse and select from a collection of media content items associated with the first content source 20a. For example, the user interface may allow the user to select between multiple content sources 20 associated with the user profile, and then browse a collection of media content items associated with the selected content source in order to choose the media content item that the device 110 will output. In some examples, the media content may correspond to audio data, image data, and/or video data without departing from the disclosure. Selection of media content may come through a spoken utterance including a playback command, a graphical user interface input, or a variety of other input processes.

To illustrate an example, the media content may include audio data representing music, speech, and/or other audible sounds, image data representing individual picture(s) (e.g., still images) or a series of images (e.g., video), a combination thereof, and/or the like without departing from the disclosure. For example, the media content may correspond to songs, radio broadcasts, audiobooks, video clips, television shows, movies, and/or other data representing other forms of entertainment without departing from the disclosure. While in some examples the media content may be available upon request (e.g., on-demand streaming), the disclosure is not limited thereto and in other examples the media content may correspond to radio broadcasts, television channels, cable television broadcasts, and/or the like without departing from the disclosure.

After the user selects the media content, the device 110 may send a request for the media content to the first content source 20a and the first content source 20a may begin delivery of the media content by sending the encoded content data 22 to the device 110 via the network(s) 199. As illustrated in FIG. 1A, the device 110 may receive the encoded content data 22 and perform decoding to output the media content using one or more output devices associated with the device 110. For example, the device 110 may include a decoder component 132 that is configured to receive the encoded content data and generate decoded content data 134. The decoder component 132 may send the decoded content data 134 to the output devices, such as a loudspeaker(s) 112 and/or a display 114, via a media interface component 140. Such a media interface component 140 is configured to configure the decoded content data 134 into a form operable by an output component, such as a loudspeaker 112, display, 114, or the like.

If the media content only corresponds to audio data and does not include any image data, the decoded content data 134 may correspond to playback audio data 142 and the media interface component 140 may send the playback audio data 142 to the loudspeaker(s) 112 to generate output audio. In contrast, if the media content only corresponds to image data (e.g., either image(s) or video) and does not include any audio data, the decoded content data 134 may correspond to playback image data 144 and the media interface component 140 may send the playback image data 144 to the display 114 to render the video on the display 114. However, if the media content corresponds to a combination of audio data and image data, then the decoded content data 134 may include the playback audio data 142 along with the playback image data 144. Thus, the media interface component 140 may send the playback audio data 142 to the loudspeaker(s) 112 and may send the playback image data 144 to the display 114.

While FIG. 1A illustrates the display 114 as being included in the device 110, the disclosure is not limited thereto. In some examples, the display 114 may be an external display, such as a television or computer monitor, that is connected to the device 110, via a wired connection, without departing from the disclosure. For example, the device 110 may send the playback image data 144 to the display 114 using a high-definition multimedia interface (HDMI) component or other such media interface component 140 without departing from the disclosure. Specifically, HDMI is an interface/protocol that follows certain standards for transmitting uncompressed video data and compressed or uncompressed digital audio data, such as linear pulse-coded modulation (LPCM) audio data. In another example, the media interface component 140 may include a universal serial bus (USB) 3.2 which as an interface/protocol that may rely on USB-C connectors and may allow data transfer rates of up to, for example, 20 Gbit/s. Such USB 3.2 media transfer may also allow transmission of decoded content data to downstream components. In another example, the media interface component 140 may include a USB4 interface which allows tunneling/high speed transmission of video/audio data with transfer rates of up to, for example, 40 Gbit/s. As can be appreciated, a number of such media transfer components 140/protocols may be used.

Further, while illustrated as part of the device 110, the loudspeaker(s) 112 may be external to the device 110 without departing from the disclosure. In some examples, the loudspeaker(s) 112 may be associated with the display 114 and the device 110 may send both the playback audio data 142 and the playback image data 144 using the HDMI/USB 3.2/USB4/other such component, although the disclosure is not limited thereto.

In addition to outputting the media content to the user, the device 110 may enable additional functionality by performing content extraction identifier generation 130 to generate extraction data 155 representing individual segments of the decoded content data 134. As illustrated in FIG. 1A, the device 110 may include an extraction ID generator component 150 that may process the decoded content data 134 and generate the extraction data 155, as will be described in greater detail below with regard to FIG. 3-4C.

The extraction ID generator 150 may be configured to perform a variety of different operations depending on the type of content extraction identifiers to be processed. In one example, the content extraction IDs corresponding to audio/video fingerprints. Such fingerprints include a small amount of data representative of a larger portion of data such as an entire song or song portion. For fingerprints, the extraction ID generator component 150 may be configured to generate fingerprints using decoded content data 134 and to output the fingerprints and corresponding metadata as extraction data 155. Accompanying orchestration and recognition operations related to the fingerprints may be performed by other components (e.g., publisher component(s), content extraction ID orchestrator component(s), consumer component(s), or the like).

In another example, the content extraction IDs may correspond to watermarks. Such watermarks include data that may be inserted into content (for example, by a content source 20) in a manner that may not be detectable by a user but is detectable by component(s) of the system. Such inserted watermark data may be used to identify what content was output by a device 110. For watermarks, the extraction ID generator component 150 may be configured to identify watermarks in decoded content data 134 and to output the watermark and corresponding metadata as extraction data 155. As with fingerprints, accompanying orchestration and recognition operations related to the watermarks may be performed by other components (e.g., publisher component(s), content extraction ID orchestrator component(s), consumer component(s), or the like).

Thus, the extraction ID generator component 150 generates an extracted representation of decoded content data 134. Such an extracted representation may include a small segment of data representative of a larger portion of the content data. Thus the extracted representation may correspond to a fingerprint, watermark, or other extracted identifier.

For ease of system illustration and explanation, the below descriptions may focus on operation with regard to fingerprints, but as can be appreciated, the system may operate using other examples of content extraction identifiers beyond fingerprints and watermarks.

Depending on whether the decoded content data 134 includes the playback audio data 142 and/or the playback image data 144, the extraction data 155 may include a plurality of audio fingerprints and/or a plurality of video fingerprints without departing from the disclosure. As used herein, an audio fingerprint may correspond to first data that includes an audio fingerprint representation of a segment of the decoded audio data, while a video fingerprint may correspond to second data that includes an image/video fingerprint representation of a segment of the decoded image data. However, the disclosure is not limited thereto, and in other examples the extraction data 155 may include a plurality of audiovisual fingerprints and/or the like without departing from the disclosure. For example, an audiovisual fingerprint (e.g., multimedia fingerprint, combined fingerprint, etc.) may correspond to third data that includes a fingerprint representation of a segment of the decoded playback data (e.g., both the decoded audio data and the decoded image data) without departing from the disclosure, although the disclosure is not limited thereto. Although illustrated as using the decoded content data 134, the extraction ID generator component 150 may also generate extraction data 155 (e.g., fingerprint data, watermark data, etc.) from playback audio data 142, playback image data 144, or other output data, depending on system configuration.

In some examples, the device 110 may generate the extraction data 155 as a series of query fingerprints corresponding to segments of the decoded content data 134. To illustrate an example, the device 110 may generate the series of query fingerprints using a first playback length (e.g., 4 seconds), although the disclosure is not limited thereto. For example, the device 110 may divide the decoded content data 134 into a plurality of segments (e.g., using continuous time windows, such that each segment corresponds to 4 seconds of the decoded content data 134) and generate the series of query fingerprints, with each segment of the decoded content data 134 represented as a unique query fingerprint. However, the disclosure is not limited thereto and a length of the query fingerprints may vary without departing from the disclosure. In some examples, the device 110 may divide the playback audio data 142 into a first plurality of segments using the first playback length (e.g., 4 seconds) and may divide the playback image data 144 into a second plurality of segments using a second playback length without departing from the disclosure. As described above, the system 100 may generate the query fingerprints using audio data, image data, a combination of audio data and image data, and/or the like without departing from the disclosure.

As illustrated in FIG. 1A, after performing content extraction identifier generation 130 to generate the extraction data 155, the device 110 may store the extraction data 155 in storage 154. Such storage 154 may correspond to memory 906, storage 908 (discussed below in reference to FIG. 9), and/or other storage component(s) that may be separate from or included in device 110. The device 110 may also, as shown in FIG. 1B, send (162) the extraction data 155 to the one or more supporting device(s) 120 via the network(s) 199. This may occur using one or more communications components 152 of user device 110. Such communications components 152 may include, for example, I/O device interfaces 902, antenna 914 (discussed below in reference to FIG. 9, and/or other components. For example, FIG. 1B illustrates an example of the system 100 performing content extraction identifier routing 160 to send the extraction data 155 (and/or other data related to content extracted identifiers) to one or more consumer components 126. In some examples, the system 100 may route the extraction data 155 to specific consumer components 126 based on metadata associated with the extraction data 155, as described in greater detail below, for example with regard to FIG. 6.

In order to perform content extraction identifier routing 160, the system 100 may include one or more publisher components 122, one or more content extraction identifier orchestrator components 124, and/or one or more consumer components 126. Functionally, the content extraction identifier 160 may correspond to two workflows that operate in parallel and are joined together by the content extraction identifier orchestrator component(s) 124. For example, a first publisher component 122 may correspond to a first workflow (e.g., publisher workflow) that is configured to receive extraction data 155 from the device(s) 110 and to publish the fingerprints in order to transfer the fingerprints from producers (e.g., device 110 generating the fingerprints) to consumers (e.g., consumer components 126 consuming the fingerprints as part of content recognition and/or other operations). The first workflow of the first publisher component may involve receiving and processing certain fingerprint types, certain fingerprint batch sizes with certain batch frequency, from certain device types, etc. and sending them to the appropriate content extraction ID orchestrator(s) 124. A second workflow of a second publisher component may involve receiving and processing different fingerprint types, with potentially different fingerprint batch sizes with their own batch frequency, from certain device types, etc. and sending them to the appropriate content extraction ID orchestrator(s) 124. The two publisher workflows may operate at least partially in parallel and potentially on the same fingerprints (e.g., a same fingerprint batch may be sent to more than one publisher component 122 for different operations). Further details of the publisher workflows are described herein.

Thus, the publisher workflow leverages distributed stream processing to distribute the fingerprints to a centralized system, such as the content extraction identifier orchestrator component(s) 124. For example, the one or more publisher components 122 may continuously accept fingerprints from multiple device(s) 110 and submit them to the first content extraction identifier orchestrator component 124a. The first content extraction identifier orchestrator component 124a may use an event streaming tool that provides publish, store, and consume capabilities. For example, the system 100 may generate a separate event to record that each query fingerprint was distributed (e.g., emitted) from the device 110 to the centralized system.

Meanwhile, the one or more consumer components 126 correspond to a second workflow (e.g., consumer workflow) that is configured to receive the extraction data 155 and consume the fingerprints as part of performing content recognition. For example, the consumer components 126 may continuously run and poll the centralized system (for example through content extraction identifier orchestrator component(s) 124) to receive new fingerprints. Thus, the publisher workflow may publish (e.g., write) events associated with the fingerprints to the centralized system (e.g., content extraction identifier orchestrator component 124), while the consumer workflow may read and process these events.

In some examples, the events (e.g., fingerprints) may be organized and stored by topics, which may be a logical grouping of events. For example, a runtime fingerprint topic may be created and the publisher workflow may publish events to this topic.

As illustrated in FIG. 1B, in a first step of the content extraction identifier 160 the device 110 may send (162) the extraction data 155 to one or more publisher components 122 to be ingested. In the example illustrated in FIG. 1B, the device 110 may send extraction data 155 to two publisher components (122a and 122b). Such sending may be at least partially in parallel. To illustrate an example, individual publisher components 122 may be configured to ingest a specific type of fingerprint data (e.g., audio fingerprints, video fingerprints, and/or the like). Thus, in some examples the device 110 may send audio fingerprints to the first publisher component 122a and may send video fingerprints to the second publisher component 122b without departing from the disclosure. However, the disclosure is not limited thereto and the device 110 may send the extraction data 155 to a single publisher component 122 without departing from the disclosure. Further, the device 110 may send the same fingerprint data to two different publishers without departing from the disclosure.

The device 110 may determine the recipient publisher component 122 based on the metadata included in the extraction data 155 and/or based on other factors such as fingerprint scale, fingerprint batching, device type, account profile information or the like. Extraction ID generator may include information in a header or other data to indicate to the communications component 152 which publisher component(s) 122 is to receive the particular extraction data 155. The device 110 may also include a component (not shown) that processes the extraction data 155 to determine the appropriate one or more recipient publisher component(s) 122 and may thus instruct the communications component 152 as to the appropriate destination(s) for the extraction data 155. Alternatively, or in addition, the supporting device(s) 120 may include a component (not shown) that receives extraction data 155 and routes it to the proper publisher component(s) 122. Such routing may be based on metadata in the extraction data, information about the device 110, and/or other information.

The publisher components 122 may then publish (164) the fingerprints by distributing them to a centralized system, such as the first content extraction identifier orchestrator component 124a, which may use an event streaming tool. The first content extraction identifier orchestrator component 124a effectively bridges the publisher workflow and the consumer workflow, enabling the one or more consumer components 126 to consume (166) the fingerprint. For example, an individual consumer component 126 may retrieve fingerprints that are relevant to the consumer component 126 based on metadata associated with the extraction data 155.

Similar to the reference database mentioned above and described in greater detail below with regard to FIG. 3, the consumer component 126 may be configured to process the extraction data 155 in order to identify the media content being output by the device 110. For example, the consumer component 126 may store first reference fingerprints corresponding to first media content and may compare the query fingerprints consumed from the first content extraction identifier orchestrator component 124a to the first reference fingerprints. If a sufficient number of the query fingerprints match the first reference fingerprints, the consumer component 126 may determine content identification data corresponding to the matching reference fingerprints and the system 100 may associate the content identification data with the media content being output by the device 110. The consumer content may then output (168) data corresponding to the identified content.

As illustrated in FIG. 1C, a consumer component 126 may perform a deduplication process 170 to determines content identification data associated with the media content output by the device 110. For example, the content identification data may indicate a single content identifier for the media content item that is associated with a series of the query fingerprints. This will avoid any over-counting of a particular content item (e.g., a movie), if multiple fingerprints of a shorter time scale (e.g., 4 seconds long) are detected for the same content item. As illustrated in FIG. 1C, the consumer component 126 may perform fingerprint comparison 172 (e.g., match a series of query fingerprints to reference fingerprints) to generate content recognition data 174 and then perform deduplication 176 (e.g., determining a single content identifier corresponding to the series of query fingerprints) to generate content verification data 178. To illustrate an example of the deduplication process, FIG. 1C illustrates a portion of the decoded content data 134 and corresponding information included in the content recognition data 174 (e.g., series of query fingerprints having a fixed length) and the content verification data 178 (e.g., single content identifier for each content item represented in the decoded content data 134). The content verification data 178 may include a variety of information such as an identifier of the content item that was recognized, playback time of the content item, an identifier of the device 110 and/or user profile corresponding to the playback time, a component used for playback, an identifier of the consumer 126 that performed the verification, etc.

In addition to receiving the playback audio data and generating the playback audio, in some examples the device 110 may be configured to capture audio data. For example, the device 110 may include a microphone array configured to generate audio data, although the disclosure is not limited thereto. Instead, the device 110 may omit a microphone and/or may include one or more individual microphones without departing from the disclosure. As is known and used herein, "capturing" an audio signal and/or generating audio data includes a microphone transducing audio waves (e.g., sound waves) of captured sound to an electrical signal and a codec digitizing the signal to generate the microphone audio data.

An audio signal is a representation of sound and an electronic representation of an audio signal may be referred to as audio data, which may be analog and/or digital without departing from the disclosure. For ease of illustration, the disclosure may refer to either audio data (e.g., microphone audio data, input audio data, etc.) or audio signals (e.g., microphone audio signal, input audio signal, etc.) without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

In some examples, the audio data may correspond to audio signals in a time-domain. However, the disclosure is not limited thereto and the device 110 may convert these signals to a subband-domain or a frequency-domain prior to performing additional processing, such as adaptive feedback reduction (AFR) processing, acoustic echo cancellation (AEC), adaptive interference cancellation (AIC), noise reduction (NR) processing, tap detection, and/or the like. For example, the device 110 may convert the time-domain signal to the subband-domain by applying a bandpass filter or other filtering to select a portion of the time-domain signal within a desired frequency range. Additionally or alternatively, the device 110 may convert the time-domain signal to the frequency-domain using a Fast Fourier Transform (FFT) and/or the like.

As used herein, audio signals or audio data (e.g., microphone audio data, or the like) may correspond to a specific range of frequency bands. For example, the audio data may correspond to a human hearing range (e.g., 20 Hz-20 kHz), although the disclosure is not limited thereto.

As used herein, a frequency band (e.g., frequency bin) corresponds to a frequency range having a starting frequency and an ending frequency. Thus, the total frequency range may be divided into a fixed number (e.g., 256, 512, etc.) of frequency ranges, with each frequency range referred to as a frequency band and corresponding to a uniform size. However, the disclosure is not limited thereto and the size of the frequency band may vary without departing from the disclosure.

Figure 2A:
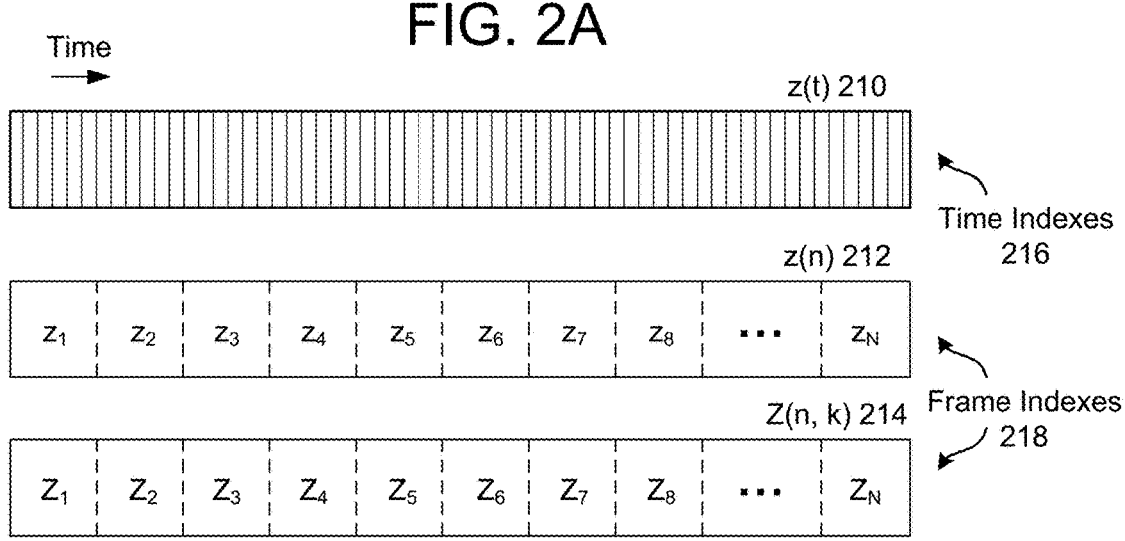
FIGS. 2A-2D illustrate examples of frame indexes, tone indexes, and channel indexes.

FIGS. 2A-2D illustrate examples of frame indexes, tone indexes, and channel indexes. As described above, the device 110 may generate microphone audio data z(t) using microphone(s). For example, a first microphone may generate first microphone audio data z1(t) in the time-domain, a second microphone may generate second microphone audio data z2(t) in the time-domain, and so on. As illustrated in FIG. 2A, a time-domain signal may be represented as microphone audio data z(t) 210, which is comprised of a sequence of individual samples of audio data. Thus, z(t) denotes an individual sample that is associated with a time t.

While the microphone audio data z(t) 210 is comprised of a plurality of samples, in some examples the device 110 may group a plurality of samples and process them together. As illustrated in FIG. 2A, the device 110 may group a number of samples together in a frame to generate microphone audio data z(n) 212. As used herein, a variable z(n) corresponds to the time-domain signal and identifies an individual frame (e.g., fixed number of samples s) associated with a frame index n.

In some examples, the device 110 may convert microphone audio data z(t) 210 from the time-domain to the subband-domain. For example, the device 110 may use a plurality of bandpass filters to generate microphone audio data z(t, k) in the subband-domain, with an individual bandpass filter centered on a narrow frequency range. Thus, a first bandpass filter may output a first portion of the microphone audio data z(t) 210 as a first time-domain signal associated with a first subband (e.g., first frequency range), a second bandpass filter may output a second portion of the microphone audio data z(t) 210 as a time-domain signal associated with a second subband (e.g., second frequency range), and so on, such that the microphone audio data z(t, k) comprises a plurality of individual subband signals (e.g., subbands). As used herein, a variable z(t, k) corresponds to the subband-domain signal and identifies an individual sample associated with a particular time t and tone index k.

For ease of illustration, the previous description illustrates an example of converting microphone audio data z(t) 210 in the time-domain to microphone audio data z(t, k) in the subband-domain. However, the disclosure is not limited thereto, and the device 110 may convert microphone audio data z(n) 212 in the time-domain to microphone audio data z(n, k) the subband-domain without departing from the disclosure.

Additionally or alternatively, the device 110 may convert microphone audio data z(n) 212 from the time-domain to a frequency-domain. For example, the device 110 may perform Discrete Fourier Transforms (DFTs) (e.g., Fast Fourier transforms (FFTs), short-time Fourier Transforms (STFTs), and/or the like) to generate microphone audio data Z(n, k) 214 in the frequency-domain. As used herein, a variable Z(n, k) corresponds to the frequency-domain signal and identifies an individual frame associated with frame index n and tone index k. As illustrated in FIG. 2A, the microphone audio data z(t) 212 corresponds to time indexes 216, whereas the microphone audio data z(n) 212 and the microphone audio data Z(n, k) 214 corresponds to frame indexes 218.

A Fast Fourier Transform (FFT) is a Fourier-related transform used to determine the sinusoidal frequency and phase content of a signal, and performing FFT produces a one-dimensional vector of complex numbers. This vector can be used to calculate a two-dimensional matrix of frequency magnitude versus frequency. In some examples, the system 100 may perform FFT on individual frames of audio data and generate a one-dimensional and/or a two-dimensional matrix corresponding to the microphone audio data Z(n). However, the disclosure is not limited thereto and the system 100 may instead perform short-time Fourier transform (STFT) operations without departing from the disclosure. A short-time Fourier transform is a Fourier-related transform used to determine the sinusoidal frequency and phase content of local sections of a signal as it changes over time.

Using a Fourier transform, a sound wave such as music or human speech can be broken down into its component "tones" of different frequencies, each tone represented by a sine wave of a different amplitude and phase. Whereas a time-domain sound wave (e.g., a sinusoid) would ordinarily be represented by the amplitude of the wave over time, a frequency-domain representation of that same waveform comprises a plurality of discrete amplitude values, where each amplitude value is for a different tone or "bin." So, for example, if the sound wave consisted solely of a pure sinusoidal 1 kHz tone, then the frequency-domain representation would consist of a discrete amplitude spike in the bin containing 1 kHz, with the other bins at zero. In other words, each tone "k" is a frequency index (e.g., frequency bin).

FIG. 2A illustrates an example of time indexes 216 (e.g., microphone audio data z(t) 210) and frame indexes 218 (e.g., microphone audio data z(n) 212 in the time-domain and microphone audio data Z(n, k) 216 in the frequency-domain). For example, the system 100 may apply FFT processing to the time-domain microphone audio data z(n) 212, producing the frequency-domain microphone audio data Z(n, k) 214, where the tone index "k" (e.g., frequency index) ranges from 0 to K and "n" is a frame index ranging from 0 to N. As illustrated in FIG. 2A, the history of the values across iterations is provided by the frame index "n", which ranges from 1 to N and represents a series of samples over time.

Figure 2B:
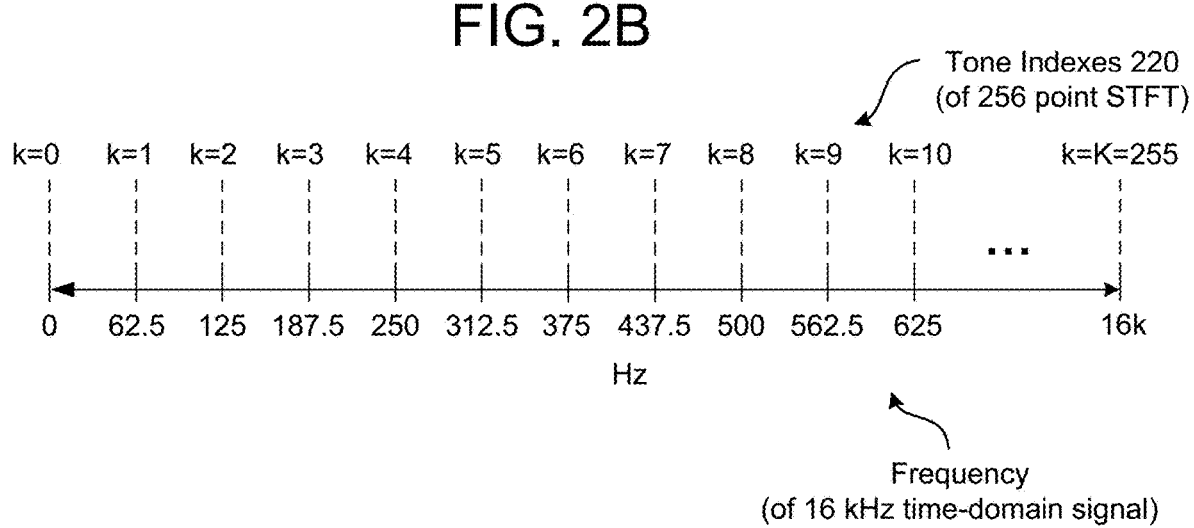

FIG. 2B illustrates an example of performing a K-point FFT on a time-domain signal. As illustrated in FIG. 2B, if a 256-point FFT is performed on a 16 kHz time-domain signal, the output is 256 complex numbers, where each complex number corresponds to a value at a frequency in increments of 16 kHz/256, such that there is 125 Hz between points, with point 0 corresponding to 0 Hz and point 255 corresponding to 16 kHz. As illustrated in FIG. 2B, each tone index 220 in the 256-point FFT corresponds to a frequency range (e.g., subband) in the 16 kHz time-domain signal. While FIG. 2B illustrates the frequency range being divided into 256 different frequency ranges (e.g., tone indexes), the disclosure is not limited thereto and the system 100 may divide the frequency range into K different frequency ranges (e.g., K indicates an FFT size). While FIG. 2B illustrates the tone index 220 being generated using a Fast Fourier Transform (FFT), the disclosure is not limited thereto. Instead, the tone index 220 may be generated using Short-Time Fourier Transform (STFT), generalized Discrete Fourier Transform (DFT) and/or other transforms known to one of skill in the art (e.g., discrete cosine transform, non-uniform filter bank, etc.).

Figure 2C:
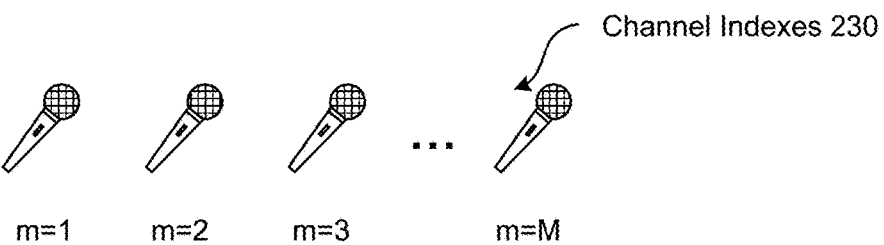

The system 100 may include multiple microphones, with a first channel m corresponding to a first microphone (e.g., m=1), a second channel (m+1) corresponding to a second microphone (e.g., m=2), and so on until a final channel (M) that corresponds to final microphone (e.g., m=M). FIG. 2C illustrates channel indexes 230 including a plurality of channels from channel m=1 to channel m=M. While an individual device 110 may include multiple microphones, during a communication session the device 110 may select a single microphone and generate microphone audio data using the single microphone. However, while many drawings illustrate a single channel (e.g., one microphone), the disclosure is not limited thereto and the number of channels may vary. For the purposes of discussion, an example of system 100 may include "M" microphones (M≥1) for hands free near-end/far-end distant speech recognition applications.

While FIGS. 2A-2D are described with reference to the microphone audio data z(t), the disclosure is not limited thereto and the same techniques apply to the playback audio data x(t) (e.g., reference audio data) without departing from the disclosure. Thus, playback audio data x(t) indicates a specific time index t from a series of samples in the time-domain, playback audio data x(n) indicates a specific frame index n from series of frames in the time-domain, and playback audio data X(n, k) indicates a specific frame index n and frequency index k from a series of frames in the frequency-domain.

Prior to converting the microphone audio data z(n) and the playback audio data x(n) to the frequency-domain, the device 110 may first perform time-alignment to align the playback audio data x(n) with the microphone audio data z(n). For example, due to nonlinearities and variable delays associated with sending the playback audio data x(n) to loudspeaker(s) using a wired and/or wireless connection, the playback audio data x(n) may not be synchronized with the microphone audio data z(n). This lack of synchronization may be due to a propagation delay (e.g., fixed time delay) between the playback audio data x(n) and the microphone audio data z(n), clock jitter and/or clock skew (e.g., difference in sampling frequencies between the device 110 and the loudspeaker(s)), dropped packets (e.g., missing samples), and/or other variable delays.

To perform the time alignment, the device 110 may adjust the playback audio data x(n) to match the microphone audio data z(n). For example, the device 110 may adjust an offset between the playback audio data x(n) and the microphone audio data z(n) (e.g., adjust for propagation delay), may add/subtract samples and/or frames from the playback audio data x(n) (e.g., adjust for drift), and/or the like. In some examples, the device 110 may modify both the microphone audio data z(n) and the playback audio data x(n) in order to synchronize the microphone audio data z(n) and the playback audio data x(n). However, performing nonlinear modifications to the microphone audio data z(n) results in first microphone audio data z1(n) associated with a first microphone to no longer be synchronized with second microphone audio data z2(n) associated with a second microphone. Thus, the device 110 may instead modify only the playback audio data x(n) so that the playback audio data x(n) is synchronized with the first microphone audio data z1(n).

While FIG. 2A illustrates the frame indexes 218 as a series of distinct audio frames, the disclosure is not limited thereto. In some examples, the device 110 may process overlapping audio frames and/or perform calculations using overlapping time windows without departing from the disclosure. For example, a first audio frame may overlap a second audio frame by a certain amount (e.g., 80%), such that variations between subsequent audio frames are reduced. Additionally or alternatively, the first audio frame and the second audio frame may be distinct without overlapping, but the device 110 may determine power value calculations using overlapping audio frames. For example, a first power value calculation associated with the first audio frame may be calculated using a first portion of audio data (e.g., first audio frame and n previous audio frames) corresponding to a fixed time window, while a second power calculation associated with the second audio frame may be calculated using a second portion of the audio data (e.g., second audio frame, first audio frame, and n−1 previous audio frames) corresponding to the fixed time window. Thus, subsequent power calculations include n overlapping audio frames.

Figure 2D:
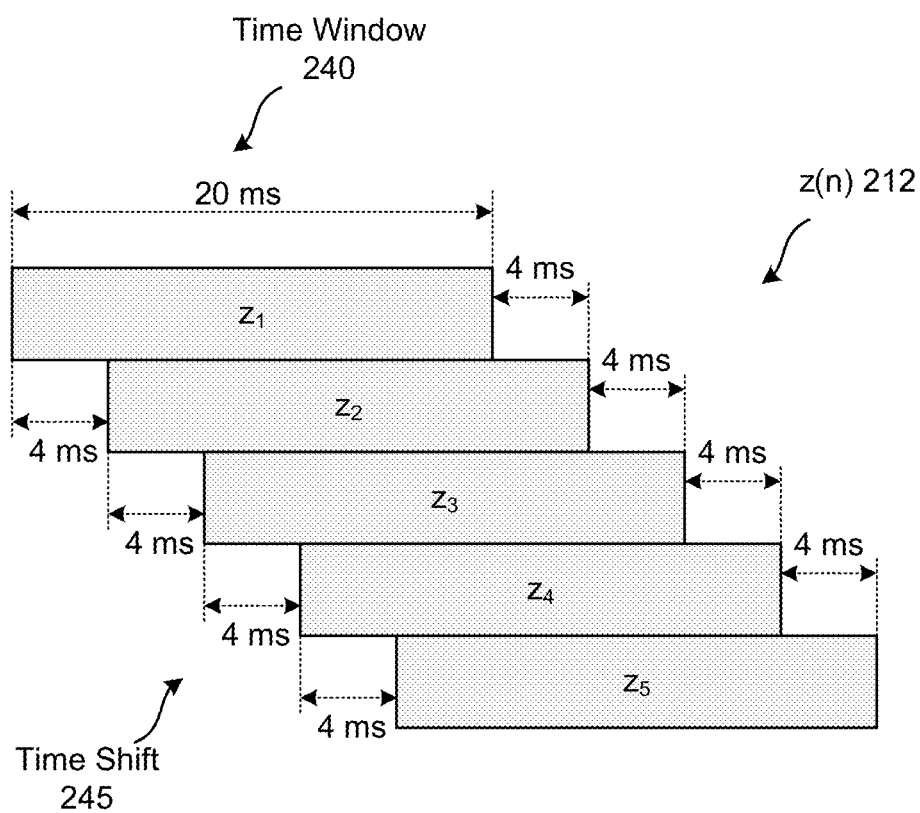

As illustrated in FIG. 2D, overlapping audio frames may be represented as overlapping audio data associated with a time window 240 (e.g., 20 ms) and a time shift 245 (e.g., 4 ms) between neighboring audio frames. For example, a first audio frame x1 may extend from 0 ms to 20 ms, a second audio frame x2 may extend from 4 ms to 24 ms, a third audio frame x3 may extend from 8 ms to 28 ms, and so on. Thus, the audio frames overlap by 80%, although the disclosure is not limited thereto and the time window 240 and the time shift 245 may vary without departing from the disclosure.

Figure 3:
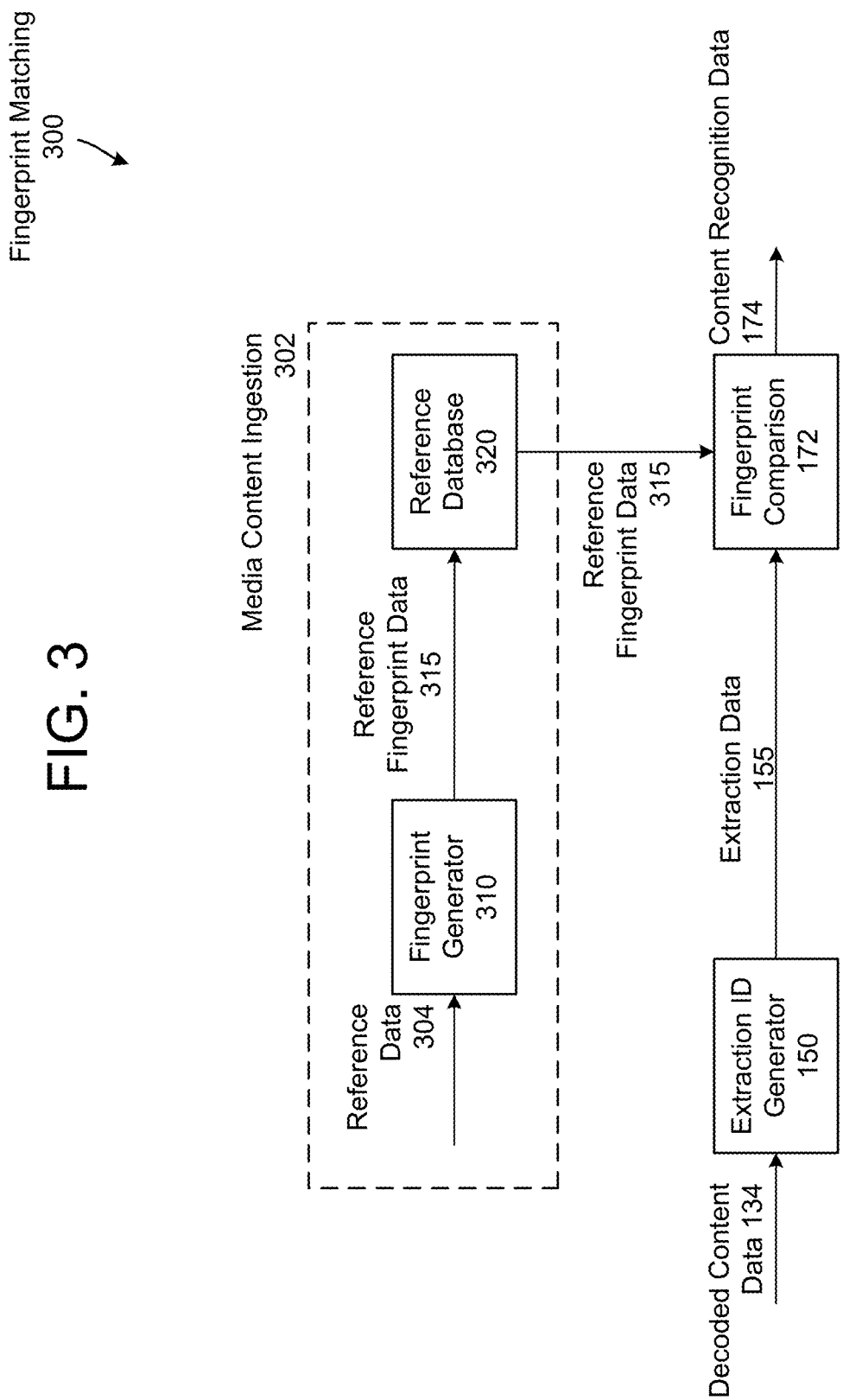
FIG. 3 illustrates an example component diagram for performing content recognition using content extraction identifiers according to embodiments of the present disclosure.

FIG. 3 illustrates an example component diagram for performing content recognition using fingerprinting according to embodiments of the present disclosure. Although discussed in reference to fingerprints, the techniques discussed herein with regard to FIG. 3/content matching may also be performed with watermarks or other extracted content IDs as well. As described above, the system 100 may limit content recognition based on privacy controls associated with each user profile. For example, privacy preferences associated with an individual user profile may control types of media content on which the system 100 may perform content recognition, the type and/or amount of data that can be used to perform content recognition, which type of information should be anonymized and/or aggregated, and/or the like. Thus, the system 100 may provide additional functionality to user profiles that enable the additional functionality, while disabling the additional functionality to user profiles that have strict privacy settings or the like. To illustrate an example of additional functionality, the system 100 may perform content recognition to enable enhanced entity resolution, which allows the system 100 to interpret voice commands based on the specific media content being output to the user.

In addition, the system 100 is limited in the specific media content that the system 100 can recognize as content recognition can only be performed for media content that was previously processed and stored in a reference database. For example, in order to perform content recognition, the system 100 must first generate the reference database including any reference fingerprints with which the system 100 intends to match as part of identifying media content. Thus, the system 100 may be configured to perform content recognition using only specific media content that is owned by, licensed to, and/or made available to the system 100 by content providers. In some examples, the system 100 may include multiple reference databases, such that an individual reference database corresponds to a single content provider, in order to separate media content and/or reference fingerprints associated with different content providers.

In the fingerprint matching 300 example illustrated in FIG. 3, media content ingestion 302 illustrates the process by which the system 100 may generate the reference database(s) 320. As illustrated in FIG. 3, a first fingerprint generator component 310 may receive reference data 304 representing media content (e.g., a particular media content item) and the first fingerprint generator component 310 may generate reference fingerprint data 315 that includes reference fingerprints corresponding to the media content. The first fingerprint generator component 310 may send the reference fingerprint data 315 to a reference database 320, which may be configured to store the reference fingerprint data 315 and/or information generated using the reference fingerprint data 315 without departing from the disclosure.

To illustrate an example, the first fingerprint generator component 310 may receive reference data 304 having a first length (e.g., 30 seconds) and may generate reference fingerprint data 315 including a series of reference fingerprints having a second length (e.g., 4 seconds). For example, the first fingerprint generator component 310 may divide the reference data 304 into a plurality of segments (e.g., using continuous time windows, such that each segment corresponds to 4 seconds of the reference data 304) and generate the series of reference fingerprints, with each segment of the reference data 304 represented as a unique reference fingerprint. However, the disclosure is not limited thereto and a length of the reference data 304 and/or a length of the reference fingerprints may vary without departing from the disclosure. For example, the reference data 304 may have a variable length (e.g., one minute, 30 minutes, 60 minutes, etc.) without departing from the disclosure and/or the first fingerprint generator component 310 may generate reference fingerprints having a fourth length (e.g., 6 seconds) without departing from the disclosure.

While the example described above refers to generating reference fingerprint data 315 for a single media content item, the disclosure is not limited thereto and the system 100 may perform media content ingestion 302 for a plurality of media content items without departing from the disclosure. For example, the reference database 320 illustrated in FIG. 3 may include reference fingerprint data 315 for hundreds or thousands of media content items without departing from the disclosure. Additionally or alternatively, the system 100 may include a plurality of reference databases 320 without departing from the disclosure.

The system 100 may perform media content ingestion 302 individually for each media content item (e.g., as the media content items are ingested), using batch processing (e.g., processing multiple media content items together), and/or the like without departing from the disclosure. Thus, in some examples the system 100 may perform media content ingestion 302 for a plurality of media content items during a period of time (e.g., initialization step), while in other examples the system 100 may perform media content ingestion 302 repeatedly over time, although the disclosure is not limited thereto.

In some examples, the media content processed during media content ingestion 302 may correspond to an audio clip and the reference fingerprints may represent audio data associated with the audio clip. For example, the reference data 304 may correspond to the audio data (e.g., representing audio signals, audio waveforms, and/or the like), and the reference fingerprint data 315 may correspond to reference fingerprints that include audio features representing the audio data. In other examples, the media content processed during media content ingestion 302 may correspond to a video clip and the reference fingerprints may represent audio data associated with the video clip. For example, the reference data 304 may correspond to audio data included in the video clip, and the reference fingerprint data 315 may correspond to reference fingerprints that include audio features representing the audio data.

While the above description illustrates examples in which the reference fingerprints are generated using audio data, the disclosure is not limited thereto. Instead, the reference fingerprints may correspond to any type of fingerprint or data structure and/or may represent any type of data without departing from the disclosure. Thus, in some examples the reference fingerprints may represent image data without departing from the disclosure. To illustrate an example, the media content processed during media content ingestion 302 may correspond to a video clip and the reference fingerprints may represent image data associated with the video clip. For example, the reference data 304 may correspond to image data included in the video clip, and the reference fingerprint data 315 may correspond to reference fingerprints that include image features representing the image data, although the disclosure is not limited thereto.

Additionally or alternatively, the reference data 304 may correspond to both image data and audio data without departing from the disclosure. For example, the reference data 304 may include image data and audio data associated with the video clip, and the reference fingerprint data 315 may represent each segment of the reference data 304 using either (i) a first reference fingerprint that includes image features representing the image data along with audio features representing the audio data, or (ii) a second reference fingerprint that includes image features representing the image data along with a third reference fingerprint that includes audio features representing the audio data.

While the examples described above refer to the reference fingerprint data 315 representing audio data and/or image data, the disclosure is not limited thereto and the reference fingerprint data 315 may correspond to any type of data without departing from the disclosure. Additionally or alternatively, while the examples described herein may refer to generating a reference fingerprint, the disclosure is not limited thereto and the system 100 may generate any type of data structure without departing from the disclosure. For example, the system 100 may generate any reference data that summarizes and/or represents characteristic components of input data without departing from the disclosure. Thus, the system 100 may map an arbitrarily large data item to a much shorter representation, which uniquely identifies the original data, and for ease of illustration the shorter representation may be referred to as a fingerprint.

In some examples, a video fingerprint may correspond to a condensed digital summary, deterministically generated from a video signal, which can be used to identify a video clip or quickly locate similar items in a video database. For example, a video fingerprint may be used to identify media content such as advertisements, video clips, television shows, movies, and/or the like without departing from the disclosure. To generate the video fingerprint, the system 100 may process video data as a series of image frames and may generate feature vector data for each image frame. For example, the feature vector data may include two-dimensional vectors and may represent information such as changes in patterns of image intensity over successive image frames without departing from the disclosure. However, the disclosure is not limited thereto and the feature vector data may include any features or characteristics of the image data without departing from the disclosure. Thus, the system 100 may perform video fingerprinting as a dimension reduction technique in which the system 100 identifies, extracts, and then summarizes characteristic components of a video as a unique or a set of multiple perceptual hashes, enabling the video to be uniquely identified, although the disclosure is not limited thereto.

In some examples, an audio fingerprint (e.g., which may also be referred to as an acoustic fingerprint) may correspond to a condensed digital summary, deterministically generated from an audio signal, which can be used to identify an audio sample or quickly locate similar items in an audio database. For example, an audio fingerprint may be used to identify media content such as songs, melodies, advertisements, video clips, movies, and/or the like without departing from the disclosure. To generate the audio fingerprint, the system 100 may process audio data as a series of overlapping or non-overlapping audio frames and may generate feature vector data for each audio frame.

In some examples, the feature vector data may be two-dimensional vectors and may include information such as energy values in individual frequency ranges without departing from the disclosure. However, the disclosure is not limited thereto and the feature vector data may include any features or characteristics of the audio data without departing from the disclosure. For example, the audio fingerprint may take into account perceptual characteristics of the audio, such that a first audio fingerprint associated with a first audio sample may match a second audio fingerprint associated with a second audio sample if the first audio sample and the second audio sample sound similar to the human ear. Thus, the feature vector data may include perceptual characteristics or features without departing from the disclosure, and examples of perceptual characteristics may include zero crossing rate, estimated tempo, average spectrum, spectral flatness, prominent tones across a set of frequency bands, bandwidth, and/or the like.

FIGS. 4A-4B illustrate examples of fingerprints according to embodiments of the present disclosure. As illustrated in FIG. 4A, an example of playback audio data 412 representing speech is shown as energy chart 410. In some examples, the system 100 may create a time-frequency graph using the playback audio data 412, such as spectrogram 420. For example, the system 100 may generate the spectrogram 420 by splitting the playback audio data 412 into segments over time and plotting the result as a graph that plots the audio using three dimensions: frequency, amplitude, and time. For example, spectrogram 420 represents frequency (e.g., frequency ranges or subbands) along a vertical axis, time (e.g., audio frames) along a horizontal axis, and amplitude (e.g., intensity values) as a color ranging from black (e.g., low intensity value) to white (e.g., high intensity value).

As illustrated in the spectrogram 420, an audio signal may be represented as individual audio frames (e.g., feature vectors corresponding to a time window). For example, a feature vector 430 may be a vertical representation of an individual audio frame that may include a number of harmonics (e.g., horizontal lines in the spectrogram 420). A particular row 432 in a sequence of feature vectors (e.g., element k in each feature vector) may be associated with the same frequency/pitch/harmonic of the audio signal at different points in time.

In some examples, the system 100 may generate an audio fingerprint by determining feature vector data similar to the spectrogram 420 illustrated in FIG. 4A. For example, the feature vector data may represent frequency content (e.g., spectral characteristics) of an individual segment of the reference data 304, which may correspond to a signature or other identification that can be used to match similar audio segments. However, the disclosure is not limited thereto, and in other examples the system 100 may generate an audio fingerprint by determining feature vector data and then extracting relevant features of the audio content from the feature vector data.

To illustrate an example of this distinction, FIG. 4B depicts a spectrogram 440, which is a visual representation of frequency content included in a portion of audio data, such as an individual segment of the reference data 304. As illustrated in FIG. 4B, the brighter the intensity values represented in the spectrogram 440, the more acoustic information is present in corresponding frequency ranges of the reference data 304. Thus, in some examples the system 100 may generate a fingerprint 445 by ignoring the noise present in other frequency ranges and focusing on these frequency peaks, which contain the most relevant information for this individual segment of the reference data 304. However, the disclosure is not limited thereto and the system 100 may generate the audio fingerprint using other techniques without departing from the disclosure.

To illustrate another example, in some examples the system 100 may generate the audio fingerprint based on secondary features calculated using the feature vector data, such as changes in intensity values between audio frames, sign of energy differences, and/or the like. For example, FIG. 4C illustrates an example of a fingerprint 460, which the system 100 may generate by determining a 32-bit fingerprint value for every frame. In order to extract a 32-bit fingerprint value for every frame, the system 100 may select 33 non-overlapping frequency bands, which may be included within a desired frequency range (e.g., 300 Hz to 2 kHz, although the disclosure is not limited thereto). In the fingerprint 460 example illustrated in FIG. 4C, the system 100 may determine a sign of energy differences (simultaneously along the time and frequency axes), as shown below:

$$F(n, m) = \begin{cases} 1 & \text{if } E(n, m) - E(n, m+1) - (E(n-1, m) - E(n-1, m+1)) > 0 \\ 0 & \text{if } E(n, m) - E(n, m+1) - (E(n-1, m) - E(n-1, m+1)) \leq 0 \end{cases} \quad [1]$$

where E(n,m) denotes the energy of band m of frame n, and F(n,m) denotes the fingerprint value for the m-th bit of frame n. As illustrated in FIG. 4C, the system 100 may use Equation [1] to generate the fingerprint 460 by extracting 256 subsequent 32-bit values from an excerpt of audio data, with a first logic value (e.g., '0') represented by a black pixel and a second logic value (e.g., '1') represented by a white pixel. However, the disclosure is not limited thereto, and the system 100 may generate the fingerprint using other techniques without departing from the disclosure.

Referring back to FIG. 3, the reference database 320 may receive reference fingerprint data 315 corresponding to each media content item with which the system 100 may perform content recognition.

Referring back to FIG. 3, as described above the system 100 must perform media content ingestion 302 prior to performing content recognition. Thus, the system 100 may perform media content ingestion 302 as an initialization step for the reference database 320, while the reference database 320 is offline (e.g., disabling the reference database 320 in order to perform media content ingestion 302 to add reference fingerprints to the reference database 320), while the reference database 320 is online (e.g., performing media content ingestion 302 for individual media content items during run-time), and/or the like without departing from the disclosure. In some examples, the reference database 320 may be associated with a plurality of households and/or businesses and only accessible via extended networks, although the disclosure is not limited thereto.

To perform content recognition, a second, on-device, extraction ID generator component 150 may receive decoded content data 134 and may generate extraction data 155 using the techniques described above with regard to the first fingerprint generator component 310. The decoded content data 134 may correspond to audio data, image data, video data, and/or the like that is being output by the device 110 to the user. For example, the decoded content data 134 may be received from a playback path (e.g., a path from a media interface component 140 to an output component such as loudspeaker 112, display 114, or the like) configured to generate output audio using loudspeaker(s) associated with the device 110, to display image data on a display associated with the device 110, and/or the like.

To illustrate a simple example, the decoded content data 134 may correspond to audio data and the second extraction ID generator component 150 may receive the decoded content data 134 from a playback audio path of the device 110 that is configured to generate playback audio (e.g., output audio) using one or more loudspeaker(s) associated with the device 110. In some examples, the device 110 may receive the audio data via the network(s) 199 while playing media content (e.g., music, audio clip, video clip, television show, movie, etc.). For example, the device 110 may receive the audio data from a content database, remote device, remote system, and/or the like that is not connected to a local area network (LAN) associated with the user profile. However, the disclosure is not limited thereto, and in other examples the device 110 may receive the audio data from a local device connected to the LAN without departing from the disclosure, such as a home server, a media content storage device, a device configured to play media content stored on physical disks, and/or the like. Additionally or alternatively, the device 110 may receive the audio data via the network(s) 199 while participating in a communication session without departing from the disclosure.

As illustrated in FIG. 3, the second extraction ID generator component 150 may generate the extraction data 155 representing one or more query fingerprints and may send the extraction data 155 to a fingerprint comparison component 172. In some examples, the second extraction ID generator component 150 may be included in the device 110 while the fingerprint comparison component 172 may be included in the system 100, for example in consumer component 126, although the disclosure is not limited thereto. In other examples, however, the second extraction ID generator component 150 and the fingerprint comparison component 172 may be included in the device 110 without departing from the disclosure.

As described in greater detail above with regard to the reference fingerprint data 315, the system 100 may generate fingerprints using audio data, image data, a combination of audio data and image data, and/or the like without departing from the disclosure. Thus, the second extraction ID generator component 150 may generate extraction data 155 that includes query fingerprints representing audio data, image data, a combination of audio data and image data, and/or the like without departing from the disclosure. In some examples, the device 110 may determine the type of data represented by the extraction data 155 and may route and/or process the extraction data 155 accordingly. For example, the device 110 may send first extraction data 155a representing audio data to a first fingerprint comparison component 172a while sending second extraction data 155b representing image data to a second fingerprint comparison component 172b, although the disclosure is not limited thereto.

The fingerprint comparison component 172 may receive the reference fingerprints from the reference database 320 and the extraction data 155 from the second extraction ID generator component 150 and may perform content recognition to determine content recognition data 174 corresponding to the decoded content data 134. For example, the extraction data 155 may include a query fingerprint comprising a plurality of frames and the fingerprint comparison component 172 may generate content recognition data 174 indicating identification data (e.g., content identification) for a media content item associated with the decoded content data 134. Thus, in some examples the content recognition data 174 may identify a single media content item being output by the device 110, although the disclosure is not limited thereto.

In some examples, the fingerprint comparison component 172 may generate content recognition data 174 indicating a single media content item corresponding to the decoded content data 134. For example, the fingerprint comparison component 172 may determine the media content item having a highest frequency of occurrence within the plurality of frames included in the query fingerprint. However, the disclosure is not limited thereto, and in other examples a number of media content items included in the content recognition data 174 may vary without departing from the disclosure. For example, the fingerprint comparison component 172 may generate the content recognition data 174 to indicate an n-best list (e.g., top 3 media content items), a variable number of media content items having a frequency above a threshold value, and/or the like without departing from the disclosure.

While reference fingerprint generation/matching is detailed above, the media content ingestion 302 may also involve generation and insertion of watermark data into content data. Such watermarks may be cataloged using reference database 320. Thus, when content data is sent to a device 110, the extraction ID generator may identify such watermarks in decoded content data 134 and may send watermark data (and corresponding metadata) in the extraction data 155. And matching operations, such as those shown in reference to FIG. 3 and described herein, may be performed to match watermarks as well. Other content extraction identifiers may also be cataloged and matched using the present system.

When a extraction data 155 is sent from a device 110 to one or more other component(s), the device 110 may also send metadata corresponding to the fingerprint. Thus extraction data 155 sent by a device 110 may include the actual fingerprint as well as the metadata. Such metadata may correspond to information about the device 110, information about the content that was fingerprinted (to the extent such information was available to the device 110), information about the fingerprint data, or other information that may be used in fingerprint processing.

Such metadata may include information about the device 110. For example, the metadata may include an identifier of the device 110, such as a device ID, serial number, or the like. The metadata may also include an indicator of a device-type, for example a device model number or indicator of what hardware component(s) (display, loudspeaker, etc.) are available to the device. The metadata may also include an indicator of which output component the media content was being played back by (such as a display, loudspeaker, etc.). The metadata may also include an identifier of a user profile associated with a device. The metadata may also include information about the device's location, time zone, etc. The metadata may also include information about what decoding technique was used by the device to determine the decoded content data 134 corresponding to the fingerprint. The metadata may also include an anonymized ID. For example, the device 110 may receive a command to send fingerprint information without user profile information. In such a situation the device 110 may omit a device ID, profile ID, and/or the like from the metadata. In certain configurations, the device 110 may instead insert an anonymized ID which may include a generic identifier that may correspond to some group data (e.g., users in the United States, devices with a monitor, or the like) but does not identify the metadata as associated with a particular device ID, user profile ID, or the like.

The metadata may also include information about the content that was fingerprinted/watermarked. For example, the metadata may include an identifier corresponding to the content source 20 that provided the content. The metadata may include time information related to when the content 22 was received by and/or output by the device 110. The metadata may include information about a signal/service quality associated with the content such as a bit error rate (BER), or other metric. The metadata may include information related to copyright information corresponding to the first content. The metadata may also including information such as an identifier of the content, information about the artist, title, album, date released, version, type of content, etc. Such data may be obtained from the content source 20 as part of input information sent to the device 110 as part of the encoded content data 22. The device may thus take such input information and include it in the output metadata as part of the extraction data 155 if such information were available.

The metadata may also include information about the fingerprint/watermark/extraction ID itself. For example, the metadata may include an identifier (e.g., unique identifier) corresponding to the fingerprint. The metadata may also include information about the particular metadata algorithm/version used to create the fingerprint data. The metadata may include information about the particular hardware component(s) used to create the fingerprint data. The metadata may include information identifying the type of fingerprint (e.g., audio fingerprint data, video fingerprint data, mixed fingerprint data, etc.). The metadata may include information indicating potential errors/error codes that were associated with the fingerprint operation. The metadata may include time data related to the fingerprint. Such time data may include a timestamp corresponding to playback of the output data, for example, by a loudspeaker 112, display 114, or the like. Such time data may include a timestamp corresponding to creating of the fingerprint data. Such time data may include a timestamp corresponding to when a watermark was detected in decoded content data 134. Such time data may include information the length of output content represented by the particular fingerprint (e.g., 4 seconds of content, 1 minute of content, etc.), information about a playback start time and/or a playback end time for the particular content represented by the fingerprint, information about the playback window, and/or other time data. The metadata may also include information about the quantity of underlying data represented by the particular fingerprint. For example, if the device 110 is configured to output fingerprints at a certain regularity, a fingerprint for content being viewed at 1.5× speed, may represent a different quantity of output data than a fingerprint for content being viewed at 1× speed. The metadata may also include information linking one fingerprint to another (for example, indicating their relative position in a sequence, or the like).

Figure 5:
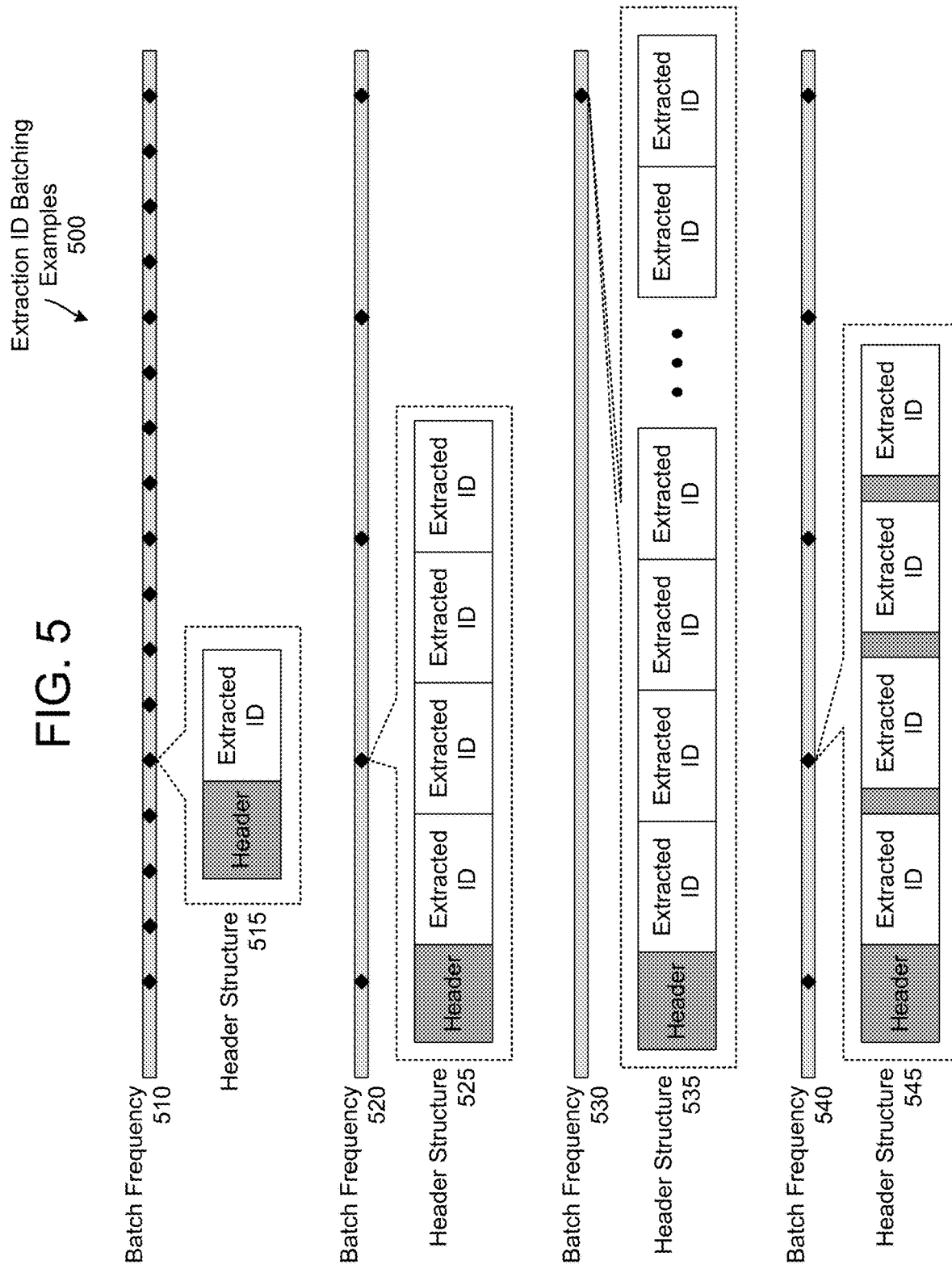
FIG. 5 illustrates examples of performing extracted identifier batching, according to embodiments of the present disclosure.

The metadata may also include information about the batching/compiling of extraction ID information, for example as relates to batching such as discussed in reference to FIG. 5. The metadata may include information about the batch/packet frequency, process used to create a batch/packet, how many fingerprints are in the packet, locations of other metadata within a packet, etc.

Metadata may be sent from a device 110 to other components (e.g., publisher 122) as part of extraction data 155. In one example, an extracted content ID and its associated metadata may be sent one at a time. In another example, extracted content IDS and metadata may be batched together. For example, FIG. 5 illustrates different examples 500 of batching of sending content extracted IDs and associated metadata. As shown, there are different configurations of sending headers/metadata and extracted content ID data. The illustrated extracted IDs may include fingerprint(s), watermark(s), and/or other extracted content ID information while the header(s) may include metadata related to the particular extracted content IDs. For purposes of illustration and discussion, the batching is discussed herein in using the example of fingerprint data, though other extracted content ID data may also be processed as described. In a first example of batch frequency 510, a fingerprint is sent with a header of header structure 515, where the header includes metadata for the particular individual fingerprint. A packet of such data (where a packet is a data compilation of header(s) and/or fingerprints as described herein) may be sent one at a time.

In another example of batch frequency 520, fingerprints may be taken for segments of output content and then grouped together for sending by the device 110, where the header of such packets is structured as illustrated in 525, such that the header may include metadata for all the fingerprints of the packet. Such headers (either for single fingerprint packets or multi-fingerprint packets) may include any of the metadata discussed herein with regard to specific fingerprints. Such headers may also include other metadata such as how many fingerprints are in the packet, time data related to when the packet is sent, time data indicating time since the last packet was sent, information about privacy/permission settings for the output device, information linking specific fingerprints to each other, information about the device's network access and whether such access went down for any period of time, information about any errors with underlying fingerprints, etc.

In another example of batch frequency 530, a packet may include a large number of fingerprints with a corresponding header structure 535 that includes metadata related to the packet/included fingerprints. In another example of batch frequency 540, a fingerprint packet may have a header structure 545 with a header including certain metadata about the included fingerprints and a separate section of metadata corresponding to each included fingerprint. As can be appreciated, many different batching/organizations of fingerprints and corresponding metadata are possible.

In certain configurations, certain components (such as certain publisher(s) 122, consumer(s) 126) may be configured to handle different packet/batch configurations for fingerprint data. In one example, one publisher may be configured to ingest fingerprints one-by-one while another publisher may be configured to take only larger batches of fingerprints (for example, one packet per minute). In such configurations the device 110 may send certain fingerprints to one publisher at one frequency and other fingerprints to another publisher 122 at a different frequency. In certain configurations, this may involve the same fingerprint being sent to different publishers in different packets, or the like.

Figure 6:
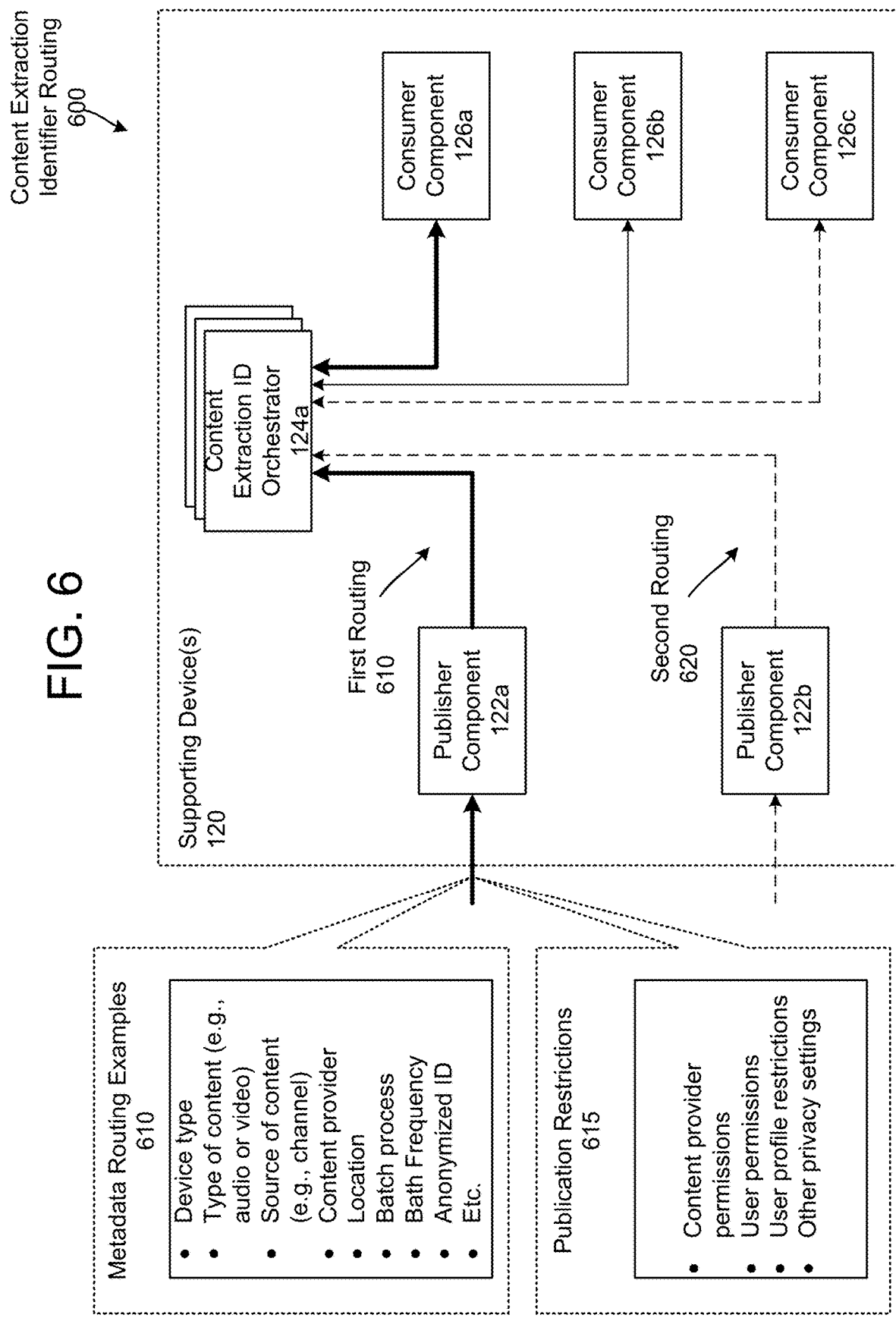
FIG. 6 illustrates examples of routing content extraction identifiers based on metadata, according to embodiments of the present disclosure.

A publisher 122 and/or content extraction identifier orchestrator component 124*a* may use the metadata for a fingerprint/packet of fingerprints to send fingerprint data to different downstream components. An example of content extraction identifier 600 is shown in FIG. 6. As shown, certain fingerprint data received by a first publisher 122*a* may be subject to first routing 610 where the publisher 122*a* may process metadata using different examples/rules for where certain fingerprints should be sent based on the underlying metadata, examples of which are shown as metadata routing examples 610. For example, publisher 122*a* may determine that fingerprints for a certain device type (e.g., device without a display) may be sent to a certain content extraction identifier orchestrator component 124*a*. The content extraction identifier orchestrator component 124*a* may then sort the fingerprints further and determine that fingerprints for a certain content provider be sent to consumer 126*a* while fingerprints for a different content provider be sent to consumer 126*b*. The publisher 122*a* may also use the metadata to identify publication restricts 615. Such publication restrictions 615 may be indicated in the metadata or may be identified by the publisher 122*a*, for example by using the device ID/profile ID/content provider ID, etc. represented in the metadata and then performing a lookup to determine permission data/setting data associated with the particular device ID/profile ID/content provider ID, etc. The publisher 122*a* may then perform routing, for example second routing 620 using that permission data/setting data. The content extraction identifier orchestrator component 124 may then perform additional routing to a particular consumer 126 based on the permission data/setting data/fingerprint metadata or other data to be used to perform content matching using the fingerprint(s).

In one example, one consumer 126 may be configured to process fingerprints corresponding to certain time lengths of content (e.g., 4 seconds) while another consumer 126 may be configured to process fingerprints corresponding to different lengths of content (e.g., 30 seconds). In such a situation, a publisher 122 may process the metadata for one fingerprint(s) and route them to one consumer based on the length of their time window and may process different metadata for different fingerprint(s) and route them to a different consumer based on the different length of their different time window.

Figure 7:
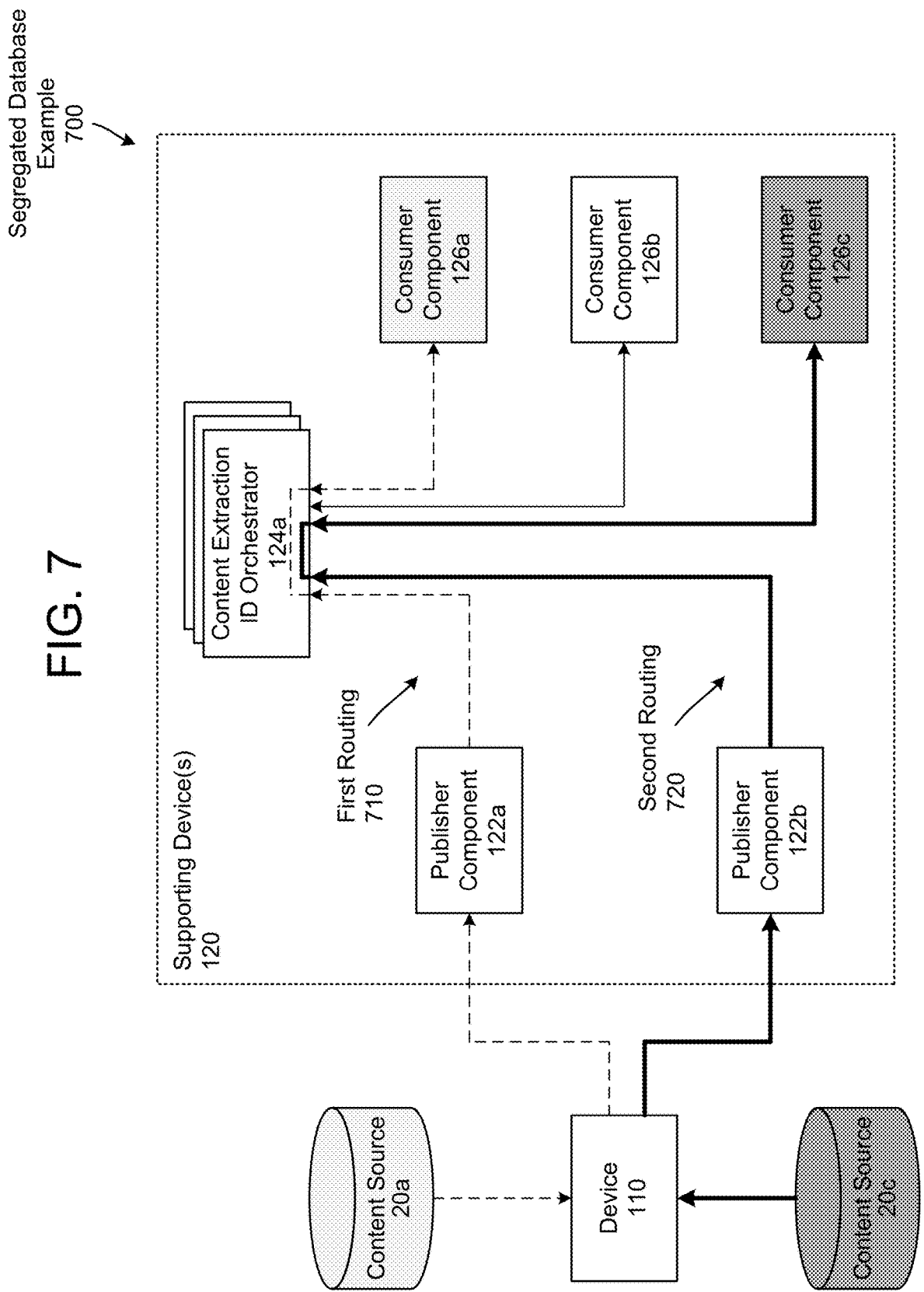
FIG. 7 illustrates examples of performing content recognition using segregated databases, according to embodiments of the present disclosure.

In another example, multiple publishers may route to certain fingerprint routers, which may then coordinate delivery of fingerprints based on the content source associated with the fingerprint. This may allow a particular consumer 126 associated with a content source 20 to perform fingerprint matching for that particular specific content source. For example, as shown in the segregated database example 700 of FIG. 7, one content source 20a (for example, streaming audio service A) may have an associated consumer 126a that is configured with reference fingerprints(s) available for the particular streaming audio service A, but not for other content providers. In this way, content providers may have individual control over creation and management of their own fingerprints. Thus, when a fingerprint is accompanied by metadata indicating content source 20a, the publisher 122 and/or content extraction identifier orchestrator component 124 may send the fingerprint data to consumer 126a for purposes of content identification, such as that performed by fingerprint comparison component 172. Similarly, a different content source 20c (for example, streaming audio service C) may have an associated consumer 126c that is configured with reference fingerprints(s) available for the particular streaming audio service C. When a fingerprint is accompanied by metadata indicating content source 20c, the publisher 122 and/or content extraction identifier orchestrator component 124 may send the fingerprint data to consumer 126c for purposes of content identification, such as that performed by fingerprint comparison component 172. In this way databases (or other data storage) for fingerprints for specific content may be segregated from each other, thus allowing content source(s) control over their own content.

Such separation of fingerprint analysis may be done based on other factors other than content source. For example, fingerprints for certain device(s) and/or device type(s) may be processed by different consumer components 126. Fingerprints for certain geographic regions or locations may be processed by different consumer components 126. Fingerprints for different time scales of content may be processed by different consumer components 126. As can be appreciated, there may be many different system configurations for routing and processing fingerprint data.

Depending on the length of content represented by a particular fingerprint, multiple fingerprints may represent a single playback instance for a particular content item. To address this, a consumer component 126 may be configured to perform deduplication, that is to only register a single playback instance for a content item despite matching many different fingerprints to the particular content item. For example, if a consumer component 126 processes a first fingerprint to determine that the first fingerprint matches a particular content item and also processes a second fingerprint to determine that the second fingerprint matches the same particular content item, the consumer component 126 may use the metadata of the respective fingerprints to figure out that they came from the same device and/or that their respective time data indicates that they go with the same content item. For example, if the first content for the first fingerprint was played back within a certain time threshold of playback for the second content for the second fingerprint, the consumer component 126 may determine (and store corresponding data) that the two fingerprints represent a single playback instance of the content item. Further, if the fingerprint for a first content item was created within a time threshold of creation of a second content item, the consumer component 126 may determine (and store corresponding data) that the two fingerprints represent a single playback instance of the content item. Such a time threshold is configurable and may depend, for example, on the content source, the device type, the length of playback of content corresponding to the fingerprint, a specific content type, the specific content item, etc. For example, for a feature length movie, the time threshold may be longer (e.g., several minutes) while for a song the time threshold may be shorter (for example, 30 seconds).

In certain system operations, fingerprints may not necessarily arrive in exact order. For example, due to timing constraints or other operational conditions, extraction data 155 for a first content item may be received by supporting device(s) 120 after extraction data 155 for a second content item, even when the second content item may have been output prior to the first content item. For example, one group of fingerprints (e.g., fingerprints 1-7) that may go with a first content item may be received, followed by another group of fingerprints (e.g., fingerprints 9-11) that go with a second content item, followed by another fingerprint (e.g., fingerprint 8) that goes with the first content item. The system may use time data, fingerprint ID information, or the like, to determine the fingerprints were received out of order and may re-order them for de-duplication purposes. The system may also select a time threshold that accounts for such potential mis-ordering.

The system may also use confidence score(s) and/or quality information for de-duplication. For example, if certain fingerprint data is associated with a low confidence score, it may be discarded or otherwise ignored for purposes of identifying a playback instance, thus reducing the number of fingerprints that may correspond to the same content item. The system may use a markov chain or similar processing to merge confidence scores across time as a way of determining the quality/usefulness of one or more fingerprints for purposes of identifying playback instance(s).

The system may also use information about the potential content item when performing deduplication. For example, the system may process fingerprint(s) that identify a first portion of a content item, but that first portion may correspond to multiple potential content items (for example, different versions of a song, a commercial with different endings, or the like). The system may then wait until it has processed fingerprint(s) corresponding to additional portion(s) of the content item to more precisely identify the content item before determining that a group of fingerprints correspond to a single playback instance of a certain content item.

Figure 8:
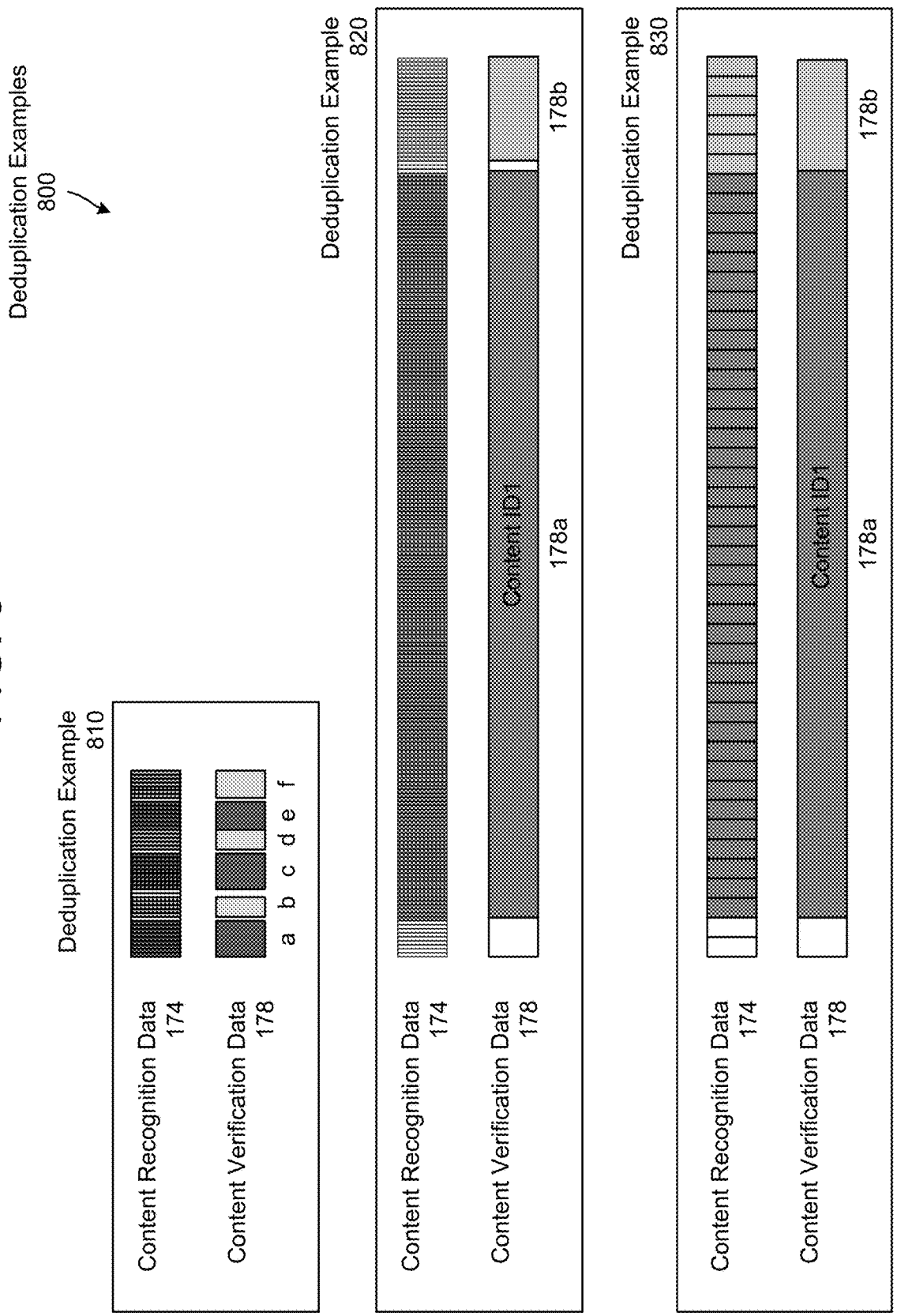
FIG. 8 illustrates examples of performing a deduplication process to generate content verification data, according to embodiments of the present disclosure.

Certain deduplication examples 800 are shown in FIG. 8. As shown in deduplication example 810, certain content recognition data 174 indicates that certain fingerprints were matched to a certain number of content items, which may be rapidly following each other. Thus the consumer component 126 may perform deduplication to arrive at content identification data 178 indicating that content items a, b, c, d, e, and f were recognized and correspond to the group of fingerprints matched in content recognition data 174. In another deduplication example 820, certain content recognition data 174 indicates that certain fingerprints were matched to one specific content item (corresponding to content ID1) for a number of fingerprints in a row. The consumer component 126 may perform deduplication to arrive at content verification 178 which indicates that the group of fingerprints corresponds to a single playback instance of content ID1, as indicated by content verification data 178a. As illustrated, the fingerprints eventually switch to recognize different content, which may be indicated by content verification data 178b. In another deduplication example 830, content recognition data 174 may correspond to fingerprints corresponding to longer lengths of content than the previous examples. For example, the fingerprints of examples 810 and 820 may correspond to a short content window (e.g., a fingerprint representation of a smaller quantity of underlying data) while the fingerprints of example 830 may correspond to a longer content window (e.g., a fingerprint representation of a larger quantity of underlying data). The consumer component 126 may use a longer time threshold in example 830 to group/de-duplicate fingerprints to arrive at content verification data 178 indicating a single playback instance of content ID1 (178a) and another playback instance of another item of content (178b).

Once determined, the consumer component 126 may store and/or output content verification data 178 indicating the identified playback instance(s) of particular content items. The content verification data 178 may include a variety of information such as an identifier of the content item that was recognized, playback time of the content item, an identifier of the device 110 and/or user profile corresponding to the playback time, a component used for playback, an identifier of the consumer 126 that performed the verification, etc.

In certain instances, however, the consumer component 126 may refrain from associating certain data with the verification data 178. For example, in certain situations, playback of content may be performed anonymously with regard to the playback device/user profile. This may be done under various system operating conditions. For example, if the system 100 is determining information about content playback generally for a group of devices, the consumer component 126 may refrain from including device ID/profile ID information in the verification data 178. In another example, the system 100 may determine, using metadata, that a particular ID is associated with the particular fingerprint. The system 100 may also determine that the particular ID is also associated with setting data indicating that playback data from the device is not to be associated with the device. The consumer component 126 may thus refrain from storing data indicating that a particular playback instances represented by verification data 178 corresponds to the particular device 110.

Various actions may be taken following recognition of a particular content item using a fingerprint. The system 100 may store data indicating the recognition and may send that data to various sources such as a device associated with a user profile, content source, etc. In certain instances, one or more component(s) of the system 100 may determine that a fingerprint item matches a particular piece of content and may then send a command to a device 110 to change its setting data. For example, if the system 100 determines that a content item matches a feature length movie, it may instruct the device 110 to change its setting data to only send fingerprint data at a reduced frequency, larger packet size, or the like. For example, the system 100 may instruct the device to switch from batch frequency 520 to batch frequency 530. In another example the system 100 may instruct the device 110 to increase (or decrease) the time windows corresponding to the particular fingerprints, based on the length of recognized content.

Figure 9:
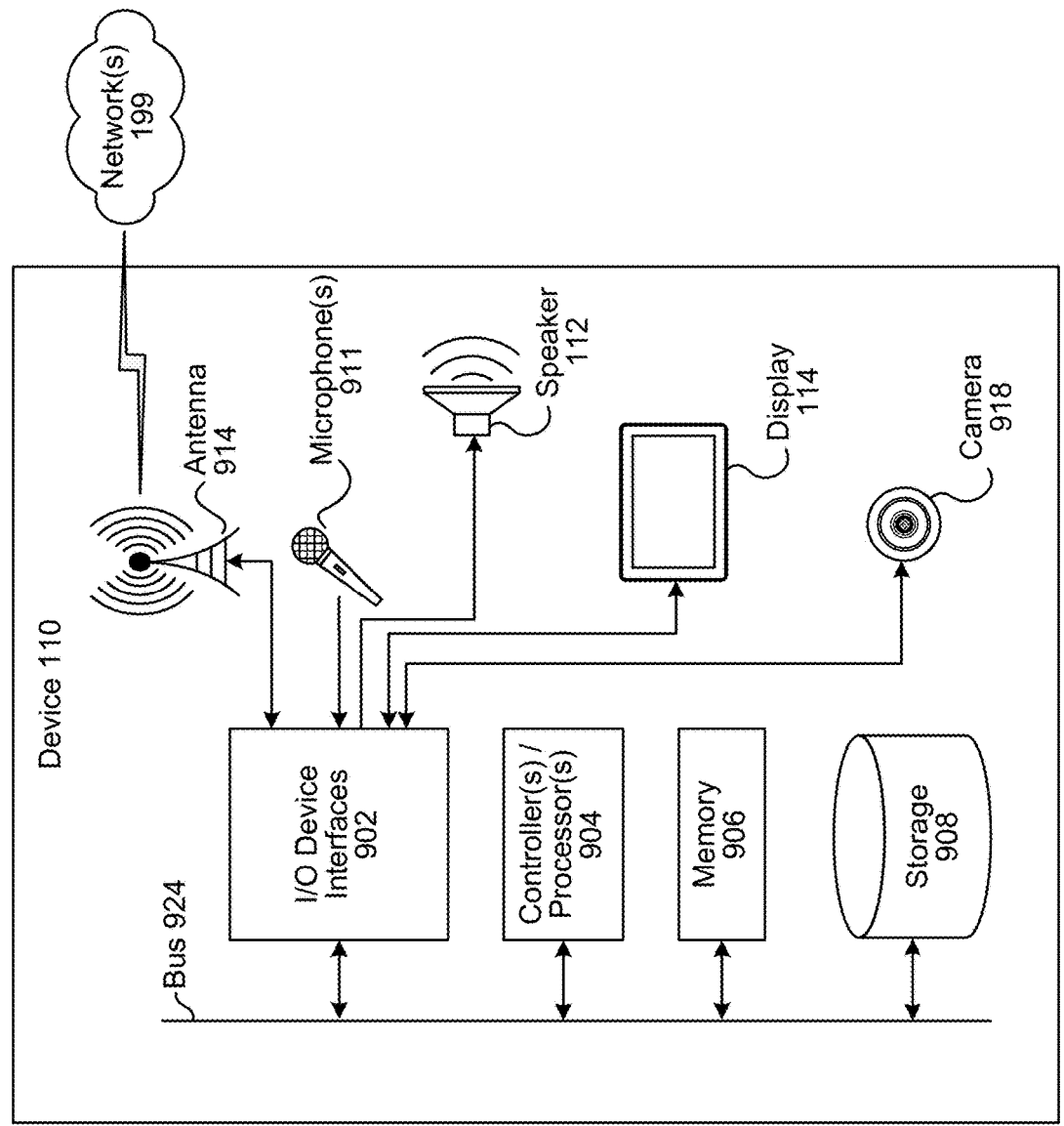
FIG. 9 is a block diagram conceptually illustrating example components of a device, according to embodiments of the present disclosure.

FIG. 9 is a block diagram conceptually illustrating example components of device 110 that may be used with the system 100. FIG. 10 is a block diagram conceptually illustrating example components of one or more content source component(s) 20 and/or supporting device(s) 120 that may be used with the system 100. In some examples, the one or more supporting device(s) 120 may include a natural language command processing subsystem, which may assist with ASR processing, NLU processing, etc. In addition, the one or more supporting device(s) 120 may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the one or more content source component(s)/supporting device(s) 120 may be located remotely from the device 110 as its operations may not require proximity to the user. The content source component(s)/supporting device(s) 120 may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). One benefit to the supporting device(s) 120 being in a user's home/business is that data used to process a command/return a response may be kept within the user's home, thus reducing potential privacy concerns.

Multiple content source component(s)/supporting device(s) 120 may be included in the overall system 100 of the present disclosure. For example, the supporting device(s) 120 may correspond to one or more natural language processing subsystems for performing ASR processing, one or more natural language processing subsystems for performing NLU processing, and/or the like. In operation, each of these subsystems may include computer-readable and computer-executable instructions that reside on the respective supporting device(s) 120, as will be discussed further below.

The components illustrated in FIGS. 9 and 10 may be in additional to/part of the additional components discussed above. For example, each of these devices (110/120) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (902/1002).

Computer instructions for operating each device (110/120) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120) includes input/output device interfaces (902/1002). A variety of components may be connected through the input/output device interfaces (902/1002), as will be discussed further below. Additionally, each device (110/120) may include an address/data bus (924/1024) for conveying data among components of the respective device. Each component within a device (110/120) may also be directly connected to other components in addition to (or instead of) being connected to other components across the bus (924/1024).

Referring to FIG. 9, the device 110 may include input/output device interfaces 902 that connect to a variety of components such as an audio output component such as one or more loudspeaker(s) 112, a wired headset or a wireless headset (not illustrated), or other component capable of outputting audio. The device 110 may also include an audio capture component. The audio capture component may be, for example, one or more microphone(s) 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 114 for displaying content. The device 110 may further include a camera 918.

Via antenna(s) 922, the input/output device interfaces 902 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components (e.g., communications component 152) that allow data to be exchanged between devices such as different physical servers in a collection of servers or other components.

The components of the device(s) (110/120) may include their own dedicated processors, memory, and/or storage. Alternatively, one or more of the components of the device(s) (110/120) may utilize the I/O interfaces (902/1002), processor(s) (904/1004), memory (906/1006), and/or storage (908/1008) of the device(s) (110/120). Thus, an ASR component may have its own I/O interface(s), processor(s), memory, and/or storage; an NLU component may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device(s) (110/120), as described herein, are illustrative, and may be located as a stand-alone device or may be included, in whole or in part, as a component of a larger device or subsystem. As can be appreciated, a number of components may exist either on the device 110 and/or the supporting device(s) 120. Unless expressly noted otherwise, the supporting device(s) 120 version of such components may operate similarly to the user device 110 version of such components and thus the description of one version (e.g., the supporting device(s) 120 or the user device 110) applies to the description of the other version (e.g., the user device 110 or the supporting device(s) 120) and vice-versa.

As illustrated in FIG. 11, multiple devices (110a-110h, 120) may contain components of the system 100 and the devices (110/120) may be connected over a network(s) 199. The network(s) 199 may include a local or private network or may include a wide network such as the Internet. Devices may be connected to the network(s) 199 through either wired or wireless connections. For example, device(s) with display 110a, device(s) 110b, an input/output limited device 110c, a display/smart television 110d, a motile device 110e, vehicle, 110f, appliance 110g, and/or headphones 110h may be connected to the network(s) 199 through a wireless service provider, over a Wi-Fi or cellular network connection, or the like. The one or more supporting device(s) 120 may be included as network-connected support devices, although the disclosure is not limited thereto. The supporting device(s) 120 may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as an ASR component, an NLU component, etc. of a natural language command processing system.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
    receiving first encoded input data corresponding to first content to be output by an output device, the first content corresponding to at least one of audio or video;
    processing the first encoded input data to determine first decoded data configured to be sent by at least one media interface component to at least one output component for presentation to a user of the output device;
    processing the first decoded data to determine first data corresponding to an extracted representation of a first portion of the first decoded data;
    determining first metadata corresponding to the first portion;
    sending, to the at least one output component of the output device via the at least one media interface component, the first portion of decoded data for playback; and
    sending, to a second component of a system that is separate from the output device, the first data and the first metadata.

2. The computer-implemented method of claim 1, further comprising:
    processing the first portion of the first decoded data to determine a first quality data representing a signal quality of the first portion; and
    including, in the first metadata, the first quality data.

3. The computer-implemented method of claim 1, further comprising:
    determining a first plurality of extracted representations, the first plurality including the first data and second data corresponding to an extracted representation of a second portion of the first decoded data;
    determining first header data comprising:
        a first identifier corresponding to the output device, and
        a second identifier representing a first content source corresponding to the first content; and
    determining a first data compilation comprising the first plurality of extracted representations, the first metadata, and the first header data,
    wherein sending, to the second component, the first data and the first metadata comprises sending, to the second component, the first data compilation.

4. The computer-implemented method of claim 3, further comprising:
    receiving a command to send fingerprint information without user profile information;
    determining a second plurality of extracted representations; and
    in response to the command, determining second header data corresponding to the second plurality, wherein the second header data omits the first identifier.

5. The computer-implemented method of claim 1, further comprising:
    determining first time data corresponding to output corresponding to the extracted representation; and
    including the first time data in the first metadata.

6. The computer-implemented method of claim 1, further comprising:
    processing the first metadata to select the second component as a destination for the first data.

7. The computer-implemented method of claim 1, further comprising:
    determining a first identifier corresponding to a first content source of the first content;
    determining permission data corresponding to the first identifier; and
    determining the permission data corresponds to authorization to determine fingerprint data.

8. The computer-implemented method of claim 1, further comprising:
    determining a first identifier corresponding to a user profile associated with the output device;
    determining permission data corresponding to the first identifier; and
    determining the permission data corresponds to authorization to determine fingerprint data.

9. The computer-implemented method of claim 1, wherein:
    sending of the first portion of decoded data uses a physical connection between the at least one media interface component and the at least one output component; and
    sending of the first data and the first metadata uses at least one network connection to the second component.

10. The computer-implemented method of claim 1, further comprising:
    after sending the first data and the first metadata, receiving, from the second component, output data based at least in part on the first content.

11. A system comprising:
    a plurality of microphones;
    at least one processor; and
    at least one memory including instructions that, when executed by the at least one processor, cause the system to:

receive first encoded input data corresponding to first content to be output by an output device, the first content corresponding to at least one of audio or video;

process the first encoded input data to determine first decoded data configured to be sent by at least one media interface component to at least one output component for presentation to a user of the output device;

process the first decoded data to determine first data corresponding to an extracted representation of a first portion of the first decoded data;

determine first metadata corresponding to the first portion;

send, to the at least one output component of the output device via the at least one media interface component, the first portion of decoded data for playback; and send, to a second component of a system that is separate from the output device, the first data and the first metadata.

12. The system of claim 11, wherein the at least one memory further comprises instructions that, when executed by the at least one processor, further cause the system to:
process the first portion of the first decoded data to determine a first quality data representing a signal quality of the first portion; and
include, in the first metadata, the first quality data.

13. The system of claim 11, wherein the at least one memory further comprises instructions that, when executed by the at least one processor, further cause the system to:
determine a first plurality of extracted representations, the first plurality including the first data and second data corresponding to an extracted representation of a second portion of the first decoded data;
determine first header data comprising:
a first identifier corresponding to the output device, and
a second identifier representing a first content source corresponding to the first content; and
determine a first data compilation comprising the first plurality of extracted representations, the first metadata, and the first header data,
wherein the instructions that cause the system to send, to the second component, the first data and the first metadata comprise instructions that, when executed by the at least one processor, cause the system to send, to the second component, the first data compilation.

14. The system of claim 13, wherein the at least one memory further comprises instructions that, when executed by the at least one processor, further cause the system to:
receive a command to send fingerprint information without user profile information;
determine a second plurality of extracted representations; and
in response to the command, determine second header data corresponding to the second plurality, wherein the second header data omits the first identifier.

15. The system of claim 11, wherein the at least one memory further comprises instructions that, when executed by the at least one processor, further cause the system to:
determine first time data corresponding to output corresponding to the extracted representation; and
include the first time data in the first metadata.

16. The system of claim 11, wherein the at least one memory further comprises instructions that, when executed by the at least one processor, further cause the system to:
process the first metadata to select the second component as a destination for the first data.

17. The system of claim 11, wherein the at least one memory further comprises instructions that, when executed by the at least one processor, further cause the system to:
determine a first identifier corresponding to a first content source of the first content;
determine permission data corresponding to the first identifier; and
determine the permission data corresponds to authorization to determine fingerprint data.

18. The system of claim 11, wherein the at least one memory further comprises instructions that, when executed by the at least one processor, further cause the system to:
determine a first identifier corresponding to a user profile associated with the output device;
determine permission data corresponding to the first identifier; and
determine the permission data corresponds to authorization to determine fingerprint data.

19. The system of claim 11, wherein:
the instructions that cause the system to send the first portion of decoded data comprise instructions that cause the system to send the first portion of decoded data using a physical connection between the at least one media interface component and the at least one output component; and
the instructions that cause the system to send the first data and the first metadata comprise instructions that cause the system to send the first data and the first metadata using at least one network connection to the second component.

20. The system of claim 11, wherein the at least one memory further comprises instructions that, when executed by the at least one processor, further cause the system to:
after sending the first data and the first metadata, receive, from the second component, output data based at least in part on the first content.

* * * * *